United States Patent
Zheng et al.

(10) Patent No.: US 12,166,213 B2
(45) Date of Patent: Dec. 10, 2024

(54) ELECTRODE SHEET, BATTERY CELL AND BATTERY

(71) Applicant: NINGDE AMPEREX TECHNOLOGY LIMITED, Ningde (CN)

(72) Inventors: Qiang Zheng, Ningde (CN); Qi Dang, Ningde (CN); Zhanzhao Fang, Ningde (CN); Qiang Tao, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 133 days.

(21) Appl. No.: 16/365,449

(22) Filed: Mar. 26, 2019

(65) Prior Publication Data

US 2020/0144624 A1    May 7, 2020

(30) Foreign Application Priority Data

Nov. 5, 2018   (CN) .......................... 201811309302.1

(51) Int. Cl.
  *H01M 4/66*     (2006.01)
  *H01M 10/0587*  (2010.01)
  (Continued)

(52) U.S. Cl.
  CPC ....... *H01M 4/667* (2013.01); *H01M 10/0587* (2013.01); *H01M 50/449* (2021.01); *H01M 50/534* (2021.01); *H01M 50/536* (2021.01)

(58) Field of Classification Search
  CPC .. H01M 4/667; H01M 50/531; H01M 50/449; H01M 10/0587; H01M 50/491
  See application file for complete search history.

(56) References Cited

U.S. PATENT DOCUMENTS

| | | | |
|---|---|---|---|
| 2003/0099880 A1* | 5/2003 | Park | H01M 50/571 429/211 |
| 2004/0115535 A1* | 6/2004 | Morita | H01M 4/364 429/231.8 |

(Continued)

FOREIGN PATENT DOCUMENTS

| | | |
|---|---|---|
| CN | 100440588 C | 12/2008 |
| CN | 101894937 A | 11/2010 |

(Continued)

OTHER PUBLICATIONS

EPO machine generated English translation of JP-2007-134149-A (Year: 2007).*

(Continued)

*Primary Examiner* — Christopher P Domone
*Assistant Examiner* — Kimberly Wyluda
(74) *Attorney, Agent, or Firm* — Morgan, Lewis & Bockius LLP

(57) ABSTRACT

The present application relates to an electrode sheet, a battery cell and a battery. The electrode sheet includes a current collector and a protective layer. The current collector includes a coated region provided with an active material layer and an uncoated region without being provided with the active material layer. The protective layer is provided on at least a part of a surface of the uncoated region, and has a porosity of 0% to 95%. For the electrode sheet according to the present application, by providing the current collector with the protective layer, the contact resistance may be increased when the electrode sheet is short-circuited, and the discharge power and the thermal runaway probability of the battery cell may be reduced when the battery cell is internally short-circuited, thereby improving the safety performance of the battery cell.

13 Claims, 10 Drawing Sheets

(51) Int. Cl.
    *H01M 50/449*  (2021.01)
    *H01M 50/534*  (2021.01)
    *H01M 50/536*  (2021.01)

(56)  References Cited

U.S. PATENT DOCUMENTS

| | | | |
|---|---|---|---|
| 2005/0277018 A1 | 12/2005 | Kim | |
| 2006/0093922 A1* | 5/2006 | Kim | H01M 50/202 |
| | | | 429/251 |
| 2007/0196732 A1 | 8/2007 | Tatebayashi et al. | |
| 2010/0188048 A1* | 7/2010 | Nishino | H02J 7/00302 |
| | | | 320/120 |
| 2010/0285342 A1 | 11/2010 | Lee et al. | |
| 2011/0014510 A1* | 1/2011 | Miyahisa | H01M 4/133 |
| | | | 29/623.5 |
| 2016/0036009 A1 | 2/2016 | Cho et al. | |
| 2016/0133934 A1 | 5/2016 | Tode et al. | |
| 2017/0288201 A1 | 10/2017 | Mimura | |
| 2017/0301959 A1 | 10/2017 | Takahashi et al. | |
| 2021/0043941 A1* | 2/2021 | Horiuchi | H01M 50/417 |

FOREIGN PATENT DOCUMENTS

| | | |
|---|---|---|
| CN | 102388485 A | 3/2012 |
| CN | 103700807 A | 4/2014 |
| CN | 103956520 A | 7/2014 |
| CN | 105322213 A | 2/2016 |
| CN | 205355186 U * | 6/2016 ........ H01M 10/0587 |
| CN | 106058296 A | 10/2016 |
| CN | 107078277 A | 8/2017 |
| CN | 107946541 A | 4/2018 |
| EP | 3226338 A1 | 10/2017 |
| JP | 2007134149 A * | 5/2007 |
| JP | 4245429 B2 | 3/2009 |

OTHER PUBLICATIONS

EPO machine generated English translation of WO 2017-11399 A1 (Year: 2017).*
Ningde Amperex Technology Limited, Extended European Search Report, EP19194249.9, Feb. 28, 2020, 14 pgs.
Ningde Amperex Technology Limited, Office Action, CN201910016479.0, Dec. 23, 2020, 10 pgs.
Ningde Amperex Technology Limited, office Action, CN201811309302.1, Dec. 24, 2020, 11 pgs.
Ningde Amperex Technology Limited, Office Action, CN201811309302.1, Aug. 4, 2020, 9 pgs.
Ningde Amperex Technology Limited, Communication Pursuant to Article 94(3), EP19194249.9, Feb. 4, 2021, 21 pgs.
R. Brdicka et al., Surface area and pore size determination Modern Methods in Heterogeneous Catalysis, VCH, Weintheim Handbook of Porous Solids, Jan. 1, 2004, XP055643749, from https://www.fhi.berlin.mpg.de/acnew/departent/pages/teaching/pages/teaching_wintersemester_2013_2014/annette_trunschke_surface_area_and_pore_analysis_131101.pdf, 52 pgs.

* cited by examiner

ELECTRODE SHEET, BATTERY CELL AND BATTERY

CROSS-REFERENCE TO RELATED APPLICATION

This application claims priority to and benefits of Chinese Patent Application Serial No. 201811309302.1, filed with China National Intellectual Property Administration on Nov. 5, 2018, the entire content of which is incorporated herein by reference.

FIELD

The present application relates to a field of electrochemical devices, more particularly to an electrode sheet, a battery cell, and a battery.

BACKGROUND

With the intelligent development of terminal equipment, a lithium-ion battery adaptive has a constantly increased volumetric energy density, and the resulting safety problem is increasingly prominent, such as an explosion event due to a short circuit inside the battery or a puncture of the battery during the disassembly. There is no mature solution in the industry regarding how to effectively prevent an internal short circuit of a battery cell from causing severe thermal runaway, which leads to the explosion of the battery cell.

SUMMARY

The present application aims to solve at least one of the technical problems existing in the related art. Accordingly, one aspect of the present application proposes an electrode sheet. The electrode sheet according to embodiments of the present application includes a current collector and a protective layer. The current collector includes a coated region provided with an active material layer and an uncoated region without being provided with the active material layer. The protective layer is provided on at least a part of a surface of the uncoated region, and in which the protective layer has a porosity of 0% to 95%.

In some embodiments, the protective layer has a conductivity of 0 S/m to $3.5\times10^7$ S/m, and a material of the protective layer includes at least one of an inorganic oxide, a high molecular polymer or a non-metallic simple substance.

Another aspect of the present application also provides a battery cell that may effectively reduce its internal short circuit points and improve its safety performance.

The battery cell according to embodiments of the present application includes a first electrode sheet, a second electrode sheet, and a separator. The first electrode sheet includes a first current collector, and the first current collector includes a first coated region provided with a first active material layer and a first uncoated region without being provided with the first active material layer. The second electrode sheet includes a second current collector, and the second current collector includes a second coated region provided with a second active material layer and a second uncoated region without being provided with the second active material layer. The separator is disposed between the first electrode sheet and the second electrode sheet. The battery cell is formed by winding or stacking the first electrode sheet, the separator, and the second electrode sheet in sequence. A protective layer is provided on a surface of at least one of the first uncoated region and the second uncoated region, and the protective layer has a porosity of 0% to 95%.

For the battery cell according to embodiments of the present application, by providing the current collector with the protective layer, the contact resistance of the electrode sheet may be increased when this battery cell is internally short-circuited, and the discharge power and the thermal runaway probability of the battery cell may be reduced when the battery cell is internally short-circuited, thereby improving the safety performance of the battery cell. Additionally, the separator may also be provided with the protective layer to improve the thermal shrinkage of the separator, thereby further enhancing the safety performance of the battery cell.

In some embodiments, the protective layer has a conductivity of 0 S/m to $3.5\times10^7$ S/m, and a material of the protective layer includes at least one of an inorganic oxide, a high molecular polymer or a non-metallic simple substance.

In some embodiments, the battery cell is formed by winding. The first current collector includes a first starting segment, a first bent segment, a first straight segment, a second bent segment, a second straight segment, and a third bent segment. The first bent segment is connected with the first starting segment, and a current collector opposite to the first starting segment and the first bent segment is defined as the first current collector. The first bent segment is disposed between the first starting segment and the first straight segment. The second bent segment is disposed between the first straight segment and the second straight segment. The third bent segment is connected with the second straight segment and opposite to the first bent segment. In a direction away from a center of the battery cell, a surface from the first straight segment to the third bent segment is provided with the first active material layer. The second current collector includes a second starting segment, two surfaces of the second starting segment are provided with the second active material layer, and along a winding direction of the battery cell, the second starting segment is disposed between the first bent segment and the second bent segment.

In some embodiments, the protective layer is provided on two surfaces of the first uncoated region of the first starting segment, the protective layer is provided on two surfaces of the first uncoated region of the first bent segment, and in a direction facing the center of the battery cell, the protective layer is provided on at least a part of a surface of the first uncoated region from the first starting segment to the third bent segment.

In some embodiments, the protective layer is further provided on at least a part of a surface of the separator.

In some embodiments, a thickness ratio of the protective layer to the first current collector is greater than or equal to 0.05, and less than or equal to 20. And a thickness ratio of the protective layer to the first active material layer is greater than or equal to 0.0025, and less than or equal to 1.

In some embodiments, a thickness ratio of the protective layer to the separator is greater than or equal to 0.4, and less than or equal to 1.5.

In some embodiments, the second current collector includes a fourth bent segment, a third straight segment, a fifth bent segment, a fourth straight segment, a sixth bent segment, and a second tail segment. The third straight segment is disposed between the fourth bent segment and the fifth bent segment. The sixth bent segment is opposite to the fourth bent segment, and the fourth straight segment is disposed between the fifth bent segment and the sixth bent segment. The second tail segment is connected with the sixth bent segment. The first current collector includes a first tail segment, two surfaces of the first tail segment are provided with the first active material layer, and along the winding direction of the battery cell, the first tail segment is disposed between the fifth bent segment and the sixth bent segment.

In some embodiments, in the direction away from the center of the battery cell, the protective layer is provided on at least a part of a surface of the second uncoated region from the fourth bent segment to the second tail segment.

In some embodiments, in a direction facing the center of the battery cell, the protective layer is provided on at least a part of a surface of the second uncoated region from the sixth bent segment to the second tail segment.

In some embodiments, a thickness ratio of the protective layer to the first current collector is greater than or equal to 0.05, and less than or equal to 20. And a thickness ratio of the protective layer to the first active material layer is greater than or equal to 0.0025 and less than or equal to 1.

In some embodiments, the battery cell further includes: a first electrode tab and a second electrode tab. The first active material layer is provided with a first groove, and the first electrode tab is disposed within the first groove or on a surface of the first uncoated region. The second active material layer is provided with a second groove, and the second electrode tab is disposed within the second groove or on a surface of the second uncoated region.

In some embodiments, the second current collector further includes an extension portion connected with the second starting segment, and in the winding direction of the battery cell, the extension portion extends into the first starting segment.

In some embodiments, the battery cell is formed by sequentially stacking a plurality of the first electrode sheets, a plurality of the separators, and a plurality of the second electrode sheets, the first electrode sheet is disposed at the outermost side of the battery cell, and a surface of the first current collector towards the outermost side of the battery cell is provided with the first uncoated region, the protective layer is provided on at least a part of a surface of the first uncoated region.

Still another aspect of the present application provides a battery that has better safety performance.

The battery according to embodiments of the present application includes a packaging case and a battery cell disposed within the packaging case. The battery cell includes a first electrode sheet, a second electrode sheet, and a separator. The first electrode sheet includes a first current collector, and the first current collector includes a first coated region provided with a first active material layer and a first uncoated region without being provided with the first active material layer. The second electrode sheet includes a second current collector, and the second current collector includes a second coated region provided with a second active material layer and a second uncoated region without being provided with the second active material layer. The separator is disposed between the first electrode sheet and the second electrode sheet. The battery cell is formed by winding or stacking the first electrode sheet, the separator, and the second electrode sheet in sequence. A protective layer is provided on a surface of at least one of the first uncoated region and the second uncoated region, and the protective layer has a porosity of 0% to 95%.

For the battery according to embodiments of the present application, by providing the current collector of the electrode sheet with the protective layer, the contact resistance of the electrode sheet may be increased when this battery is internally short-circuited, and the discharge power and the thermal runaway probability of the battery may be reduced when the battery is internally short-circuited, thereby improving the safety performance of the battery. Additionally, the separator may also be provided with the protective layer to improve the thermal shrinkage of the separator, thereby further enhancing the safety performance of the battery.

BRIEF DESCRIPTION OF THE DRAWINGS

These and other aspects and advantages of embodiments of the present application will become apparent and more readily appreciated from the following descriptions made with reference to the drawings, in which.

Figure 1:
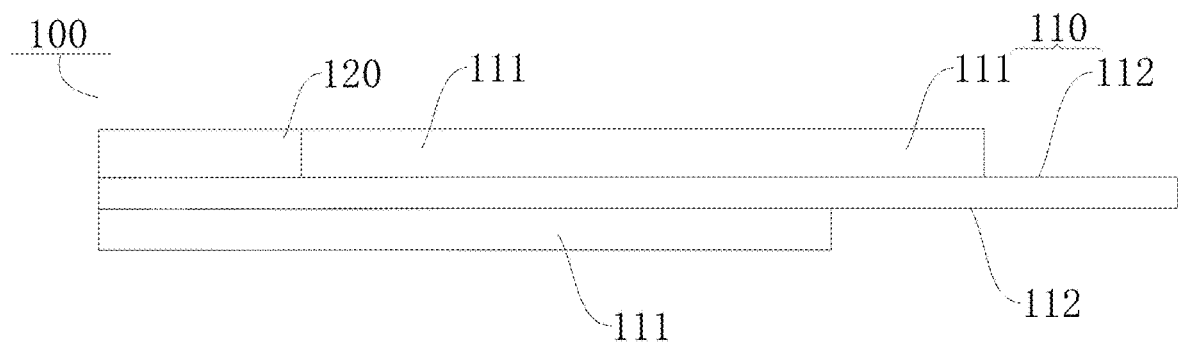
FIG. 1 is a sectional view of an electrode sheet according to an embodiment of the present application.

REFERENCE NUMERALS electrode sheet 100, current collector 110, active material layer 111, uncoated region 112, protective layer 120, battery cell 200, first electrode sheet 210, first current collector 220, first starting segment 221, first bent segment 222, first straight segment 223, second bent segment 224, second straight segment 225, third bent segment 226, first tail segment 227, first active material layer 228, first uncoated region 229, second electrode sheet 230, second current collector 240, second starting segment 241, fourth bent segment 242, third straight segment 243, fifth bent segment 244, fourth straight segment 245, sixth bent segment 246, second tail segment 247, extension portion 248, second active material layer 250, second uncoated region 251, separator 260, first electrode tab 270, first groove 271, second electrode tab 280, second groove 281.

DETAILED DESCRIPTION

Embodiments of the present application will be described in detail and examples of the embodiments will be illustrated in the accompanying drawings, where same or similar reference numerals are used to indicate same or similar elements or elements with same or similar functions. The embodiments described herein with reference to the accompanying drawings are explanatory, illustrative, and used to generally understand the present application. The embodiments shall not be construed to limit the present application.

An electrode sheet, a battery cell 200, and a battery 300 according to embodiments of the present application will be described below with reference to the accompanying drawings.

Figure 2:
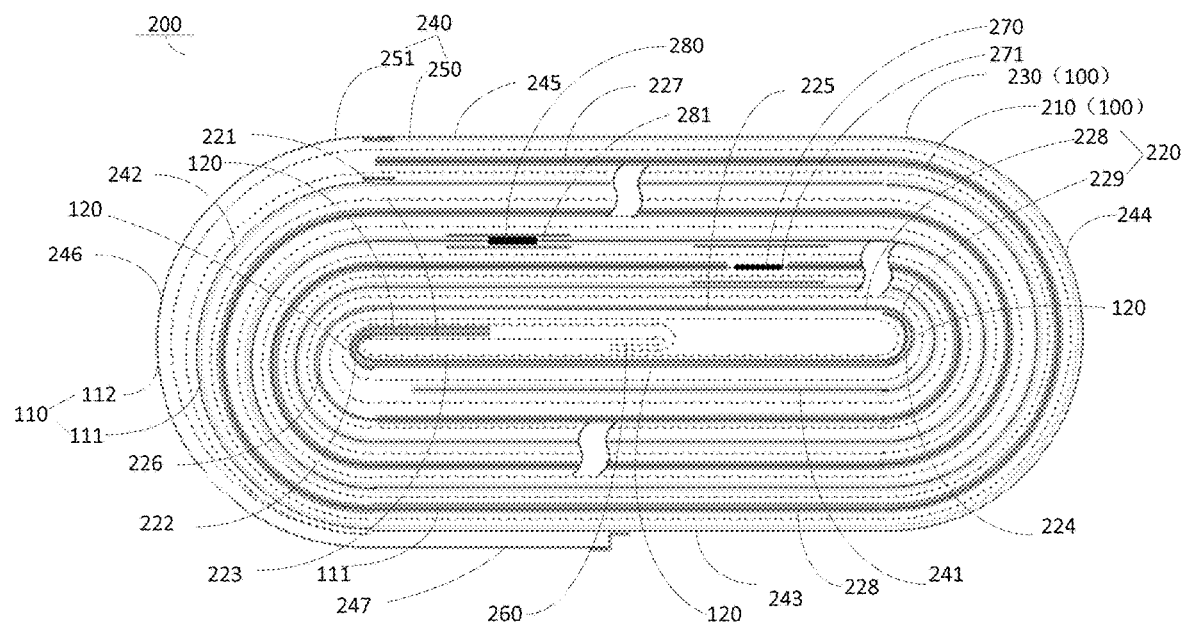
FIG. 2 is a sectional view of a battery cell according to an embodiment of the present application.

As illustrated in FIG. 2, the electrode sheet 100 according to embodiments of the present application includes a current collector 110 and a protective layer 120. The current collector 110 includes a coated region provided with an active material layer 111 and a uncoated region 112 without being provided with the active material layer 111. The protective layer 120 is provided on at least a part of a surface of the uncoated region 112, and the protective layer 120 may also be provided on the entire surface of the uncoated region 112, in which the protective layer 120 has a porosity of 0% to 95%.

For the electrode sheet 100 according to the embodiments of the present application, by providing the current collector 110 with the protective layer 120, the contact resistance of the electrode sheet may be increased when the battery cell 200 wound or stacked by the electrode sheet is internally short-circuited, and the discharge power and the thermal runaway probability of the battery cell 200 may be reduced when the battery cell 200 is internally short-circuited, thereby improving the safety performance of the battery cell 200.

According to some embodiments of the present application, the porosity of the protective layer 120 may be 0% to 50%. That is, the porosity of the protective layer 120 may be greater than or equal to 0, and less than or equal to 50%. It should be noted that when the porosity of the protective layer 120 has a value range of 0% to 50%, the contact resistance may be increased better when the battery cell is internally short-circuited, and the discharge power and the thermal runaway probability of the battery cell 200 may be reduced when the battery cell 200 is internally short-circuited, thereby better improving the safety performance of the battery cell 200. In some embodiments, the porosity of the protective layer 120 may be 0% to 50%. In some embodiments, the porosity of the protective layer 120 may be 0% to 19%. In some embodiments, the porosity of the protective layer 120 may be 0% to 15%. In some embodiments, the porosity of the protective layer 120 may be 0% to 10%. As the porosity of the protective layer 120 is decreased, the safety performance of the battery cell 200 is better.

According to some embodiments of the present application, the protective layer 120 may have a conductivity of 0 S/m to $3.5 \times 10^7$ S/m. That is, the conductivity of the protective layer 120 may have a value range which is greater than or equal to 0 S/m, and less than or equal to $3.5 \times 10^7$ S/m. In some embodiments, when the conductivity of the protective layer 120 has a value range of 0 S/m to $9.9 \times 10^5$ S/m, the contact resistance of the electrode sheet may be increased better when the battery cell is internally short-circuited, and the discharge power and the thermal runaway probability of the battery cell 200 may be reduced when the battery cell 200 is internally short-circuited, thereby improving the safety performance of the battery cell better. In some embodiments, the conductivity of the protective layer 120 may be 0 S/m to $4 \times 10^5$ S/m. In some embodiments, the conductivity of the protective layer 120 may be 0 S/m to $9 \times 10^{-14}$ S/m. In some embodiments, the conductivity of the protective layer 120 may be 0 S/m to $4 \times 10^{-14}$ S/m. According to some embodiments of the present application, a material of the protective layer 120 includes at least one of an inorganic oxide, a high molecular polymer or a non-metallic simple substance. It should be understood that, in some embodiments, the material of the protective layer 120 may be a combination of an inorganic oxide and a high molecular polymer, or a combination of an inorganic oxide and a non-metallic simple substance. In some embodiments, the inorganic oxide may be at least one of magnesium oxide, calcium oxide, silicon oxide, lithium cobalt oxide or boehmite, etc. In some embodiments, the high molecular polymer may be at least one of polypropylene, polyvinyl chloride, polyethylene, epoxy resin, polyacrylate, or urethane rubber, etc. In some embodiments, the non-metallic simple substance may be graphite. Additionally, in some embodiments, the protective layer may also be an adhesive tape, a major ingredient of the adhesive tape is a mixture composed of polyethylene terephthalate, butyl rubber, aluminum oxide, etc., or may also be a mixture composed of other polymers, inorganic oxides, non-metallic simple substances, etc., for example, a mixture composed of two or more of polypropylene, polyvinyl chloride, polyethylene, epoxy resin, polyacrylate, urethane rubber, magnesium oxide, calcium oxide, silicon oxide, boehmite, graphite, etc.

As illustrated in FIGS. 2 to 20, a plurality of battery cells of different structures prepared using the electrode sheet structure described in FIG. 1 are shown. The battery cell 200 includes a first electrode sheet 210, a second electrode sheet 230, and a separator 260. At least one of the first electrode sheet 210 and the second electrode sheet 230 adopts the electrode sheet structure having the protective layer 120, as illustrated in FIG. 1. Specifically, as shown in FIG. 2, the first electrode sheet 210 includes a first current collector 220, the first current collector 220 includes a first coated region provided with a first active material layer 228 and a first uncoated region 229 that is not provided with the first active material layer 228. The second electrode sheet 230 includes a second current collector 240, the second current collector 240 includes a second coated region provided with a second active material layer 250 and a second uncoated region 251 that is not provided with the second active material layer 250. The separator 260 is disposed between the first electrode sheet 210 and the second electrode sheet 230. The protective layer 120 is provided on a surface of at least one of the first uncoated region 229 and the second uncoated region 251, and the protective layer 120 has a porosity of 0% to 95%. In some embodiments, the porosity of the protective layer 120 may be 0% to 19%.

Figure 20:
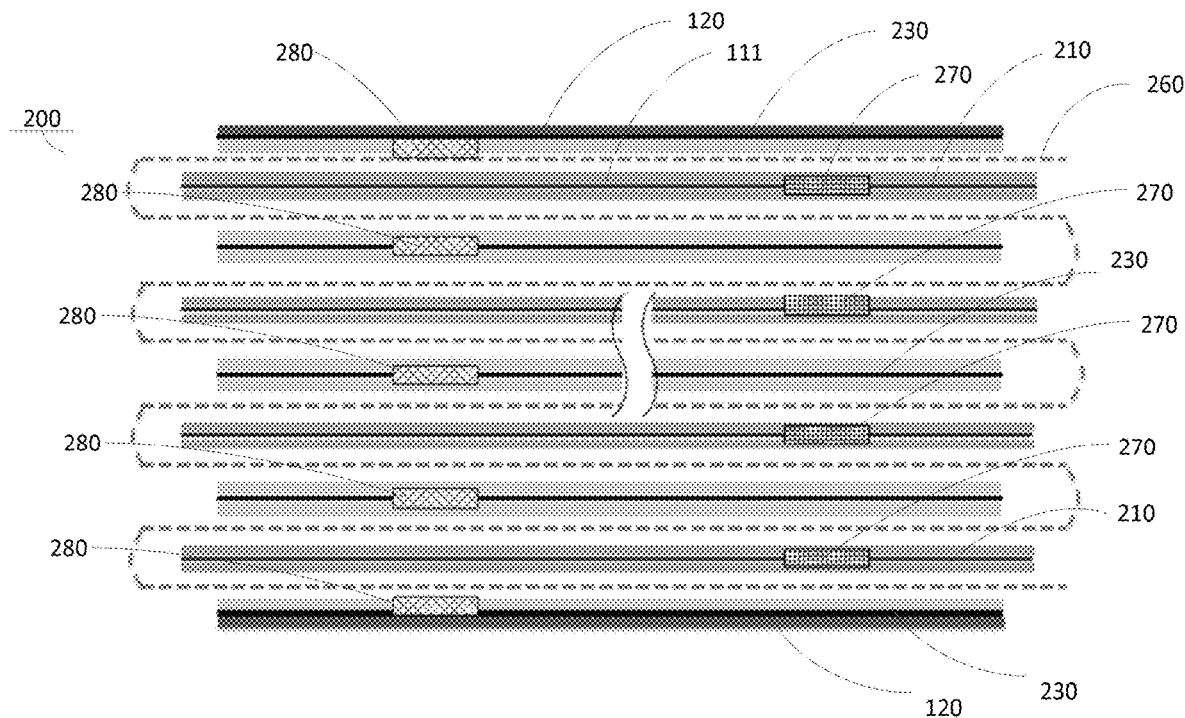
FIG. 20 is a sectional view of a battery cell according to another embodiment of the present application.

The battery cell 200 may be formed by winding or stacking the first electrode sheet 210, the separator 260 and the second electrode sheet 230 in sequence. For example, as illustrated in FIG. 2, the battery cell 200 may be formed by sequentially winding the first electrode sheet 210, the separator 260 and the second electrode sheet 230. For another example, as illustrated in FIG. 20, the battery cell 200 is formed by sequentially stacking the first electrode sheet 210, the separator 260 and the second electrode sheet 230.

For the battery cell 200 according to the embodiments of the present application, by providing a surface of at least one of the first uncoated region 229 and the second uncoated region 251 with the protective layer 120, when the battery cell 200 is internally short-circuited, the contact resistance of the electrode sheet may be increased, the discharge power may be lowered, and the thermal runaway probability of the battery cell 200 may be reduced, thereby improving the safety performance of the battery cell 200.

According to some embodiments of the present application, the conductivity of the protective layer 120 may be 0 S/m to $3.5 \times 10^7$ S/m. The lower the conductivity of the protective layer 120 is, when the battery cell 200 is internally short-circuited, the greater the contact resistance of the electrode sheet 100 is, the lower the thermal runaway probability of the battery cell 200 is, and thus the higher protective layer 120 the safety performance of the battery cell 200 is. According to some embodiments of the present application, the material of the protective layer 120 includes at least one of an inorganic oxide, a high molecular polymer or a non-metallic simple substance, and the material of the protective layer may include the above-mentioned materials. In some embodiments, the protective layer 120 has a pore size ranging from 1 nm to 100 μm. In some embodiments, the protective layer 120 has a pore size ranging from 1 nm to 50 μm.

In some embodiments, the protective layer 120 may have a thickness of 0.1 μm to 200 μm. When the thickness of the protective layer 120 is greater than 200 μm, the energy density of the battery cell is greatly affected. When the thickness of the protective layer 120 is smaller than 0.1 μm, the safety performance of the battery cell may not be improved significantly. The thicker the protective layer is, the smaller the probability that the current collector of the electrode sheet participates in the internal short circuit will be, and the higher the safety performance of the battery cell will be. In some embodiments, the thickness of the protective layer 120 may be 0.5 μm to 100 μm. In some embodiments, the thickness of the protective layer 120 may be 5 μm to 50 μm. The thickness of the protective layer is equal to or greater than a thickness of the current collector/20, and equal to or less than a thickness of the active material layer, and in such a case, the energy density of the battery cell will not be affected.

In some embodiments, the thickness of the current collector 110 may be 5 μm to 13 μm. According to some embodiments of the present application, a ratio of the thickness of the protective layer 120 to the thickness of the current collector 110 ranges from 0.05 to 20, in which the current collector herein may be understood as the first current collector 220 or the second current collector 240, and the protective layer 120 is a protective layer provided on the corresponding current collector. In some embodiments, the ratio of the thickness of the protective layer 120 to the current collector 110 ranges from 0.5 to 10. According to some embodiments of the present application, a ratio of the thickness of the protective layer 120 to the thickness of the active material layer 111 ranges from 0.0025 to 1, in which the active material layer herein may be understood as the first active material layer 228 or the second active material layer 250, and the protective layer 120 is a protective layer provided on the same current collector as the active material layer. In some embodiments, the ratio of the thickness of the protective layer 120 to the thickness of the active material layer 111 ranges from 0.1 to 1. In some embodiments, the ratio of the thickness of the protective layer 120 to the thickness of the active material layer 111 ranges from 0.25 to 1.

In some embodiments, in the battery cell structure shown in FIGS. 2 to 20, the protective layer 120 may also be provided on at least a part or all of a surface of the separator 260 (not illustrated). It could be understood that the protective layer 120 may be provided on at least a part or all of one surface of the separator 260, or the protective layer 120 may be provided on at least a part or all of two surfaces of the separator 260. By providing the protective layer 120 on at least a part of the surface of the separator 260, the thermal shrinkage of the separator 260 may be improved, and the safety performance of the battery cell 200 may be further improved. In some embodiments, a ratio of the thickness of the protective layer 120 on the separator 260 to the thickness of the separator 260 ranges from 0.4 to 1.5. If the ratio is less than 0.4, the thermal shrinkage of the separator may not be improved significantly, the internal short-circuit point may not be reduced effectively, and the nail performance of the battery cell is not improved. If the ratio is greater than 1.5, the volumetric energy density of the battery cell will be affected, and at the same time, the transmission distance of Li+ (lithium ion) is increased, which affects the discharge performance of the battery cell. In some embodiments, the thickness of the separator 260 is 3 μm to 10 μm. In some embodiments, the ratio of the thickness of the protective layer 120 on the separator 260 to the thickness of the separator 260 ranges from 0.4 to 1. The thicker the protective layer on the separator is, the higher the safety performance of the battery cell is.

In some embodiments of the present application, as illustrated in FIG. 2, the battery cell 200 may be formed by winding, and along a winding direction of the first current collector 220, the first current collector 220 may include a first starting segment 221, a first bent segment 222, a first straight segment 223, a second bent segment 224, a second straight segment 225, and a third bent segment 226 connected in sequence. The first bent segment 222 is connected with the first starting segment 221, and a current collector opposite to the first starting segment 221 and the first bent segment 222 is defined as the first current collector 220, that is, the battery cell 200 is not internally provided with an area where the first current collector 220 is opposite to the second current collector 240. In other words, after the first starting segment 221 and the first bent segment 222 of the first current collector 220 finish the winding, a second starting segment 241 of the second current collector 240 starts to wind. At this time, the first current collector 220 is wound together with the second current collector 240. When the second straight segment 225 and the third bent segment 226 of the first current collector 220 are wound, a partial structure of the second straight segment 225 is opposite to the first starting segment 221, and the third bent segment 226 is opposite to the first bent segment 222. With this structure, no internal short-circuit will occur between the first current collector 220 and the second current collector 240, and a plurality of separator layers may be omitted, which may not only enhance the safety performance of the battery cell 200, but also improve the energy density of the battery cell 200.

As illustrated in FIG. 2, the first bent segment 222 is disposed between the first starting segment 221 and the first straight segment 223, the second bent segment 224 is disposed between the first straight segment 223 and the second straight segment 225, the third bent segment 226 is connected with the second straight segment 225, and the third bent segment 226 is opposite to the first bent segment 222. In a direction away from a center of the battery cell 200, a surface from the first straight segment 223 to the third bent segment 226 is provided with the first active material layer 228. The second current collector 240 may include the second starting segment 241, two surfaces of the second starting segment 241 are provided with the second active material layer 250, and along a winding direction of the battery cell 200, the second starting segment 241 is disposed between the first bent segment 222 and the second bent segment 224. The protective layer 120 may be disposed on at least a part of a surface of the first uncoated region 229 from the first starting segment 221 to the third bent segment 226.

Figure 3:
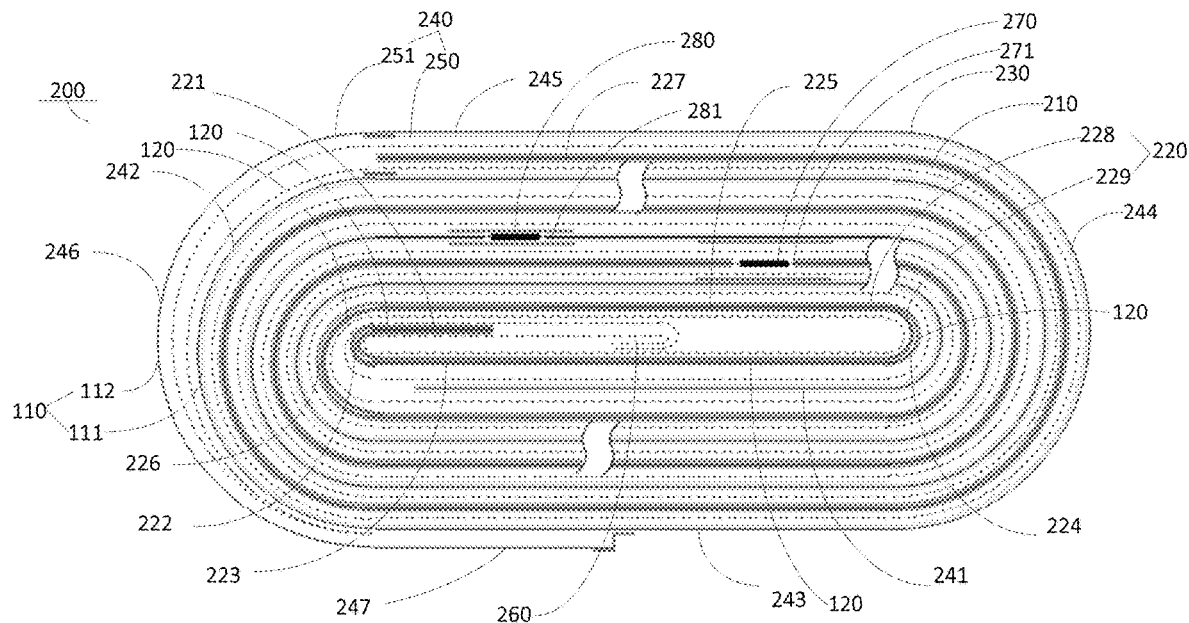
FIG. 3 is a sectional view of a battery cell according to another embodiment of the present application.

In some embodiments, as illustrated in FIG. 2, the protective layer 120 is provided on two surfaces of the first uncoated region 229 of the first starting segment 221, the protective layer 120 is provided on two surfaces of the first uncoated region 229 of the first bent segment 222, and surfaces of the first straight segment 223 and the second bent segment 224 towards a center of the battery cell 200 are respectively provided with the protective layer 120. FIG. 3 illustrates another arrangement of the protective layer 120, in which different from FIG. 2, surfaces of the second straight segment 225 and the third bent segment 226 towards the center of the battery cell 200 are further provided with the protective layer 120, respectively.

According to some embodiments of the present application, in a winding direction of the second current collector 240, the second current collector 240 may include a fourth bent segment 242, a third straight segment 243, a fifth bent segment 244, a fourth straight segment 245, a sixth bent segment 246, and a second tail segment 247 connected sequentially. The third straight segment 243 is disposed between the fourth bent segment 242 and the fifth bent segment 244, the sixth bent segment 246 is opposite to the fourth bent segment 242, the fourth straight segment 245 is disposed between the fifth bent segment 244 and the sixth bent segment 246, and the second tail segment 247 is connected with the sixth bent segment 246. The first current collector 220 includes a first tail segment 227, two surfaces of the first tail segment 227 are provided with the first active material layer 228, and along the winding direction of the battery cell 200, the first tail segment 227 is disposed between the fifth bent segment 244 and the sixth bent segment 246. The protective layer 120 may be disposed on at least a part of a surface of the second uncoated region 251 from the fourth bent segment 242 to the second tail segment 247. When a sharp object (like a steel nail) pierces the battery cell 200, the protective layer 120 may avoid a short-circuit due to direct contact between the steel nail and the second current collector 240 and the first active material layer 228, reduce the discharge power of the internal short circuit, and avoid the thermal runaway, thereby improving the safety performance of the battery cell 200. In some embodiments, ends of the first tail segment 227 and the second tail segment 247 may be respectively provided with an insulation paste to enhance the safety performance of the battery cell 200.

Figure 4:
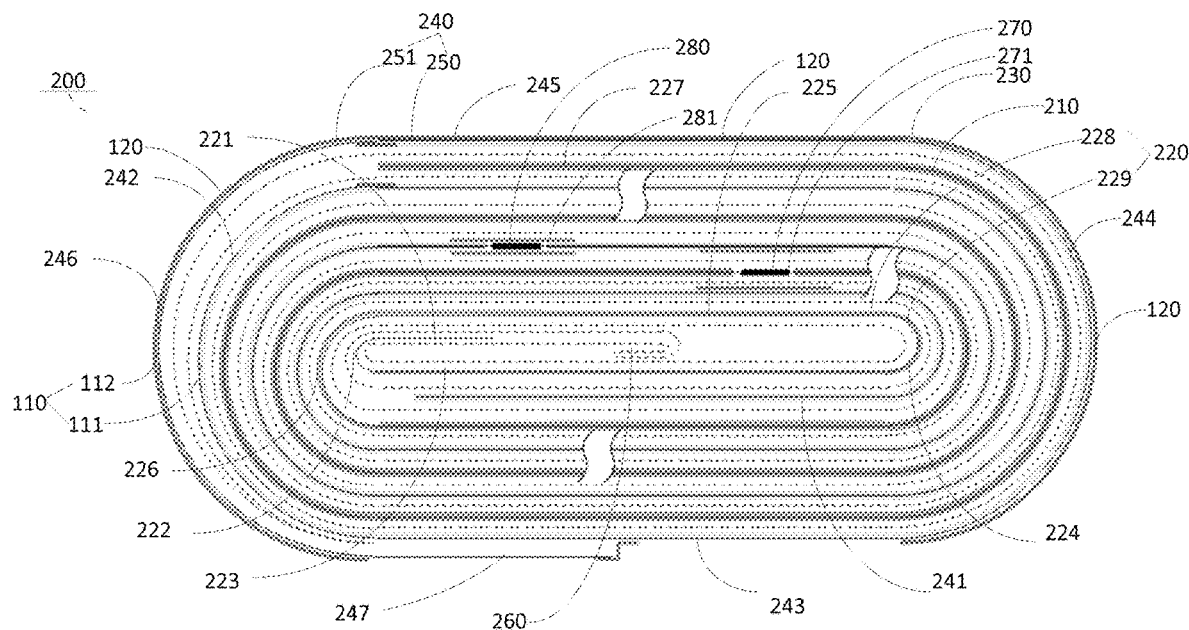
FIG. 4 is a sectional view of a battery cell according to another embodiment of the present application.
Figure 5:
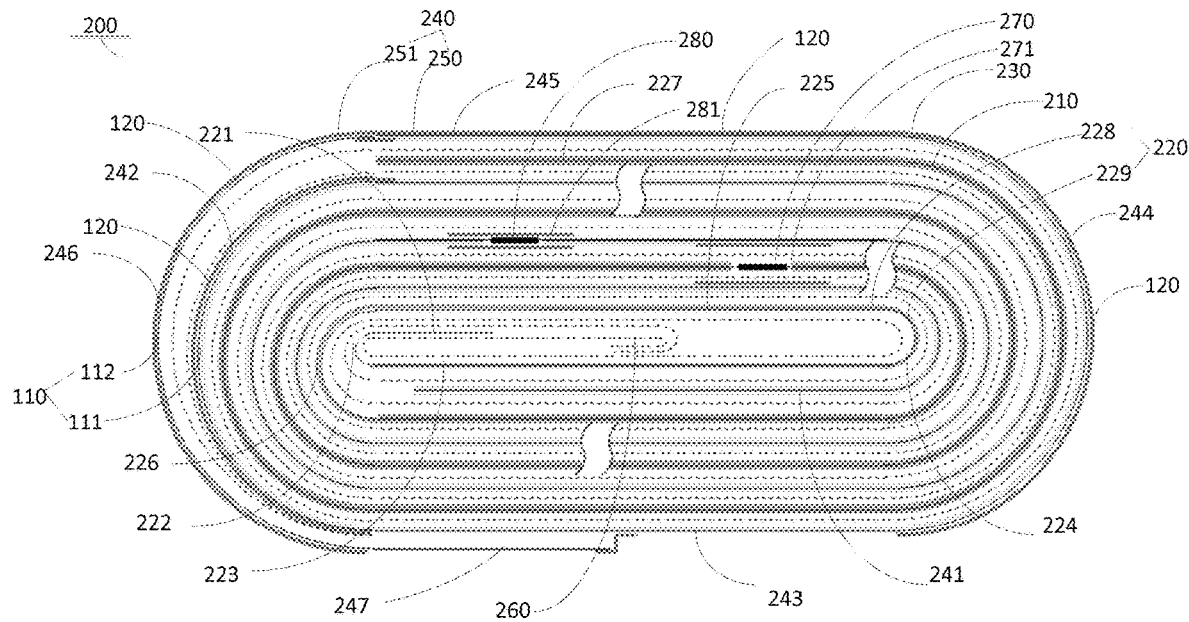
FIG. 5 is a sectional view of a battery cell according to another embodiment of the present application.
Figure 6:
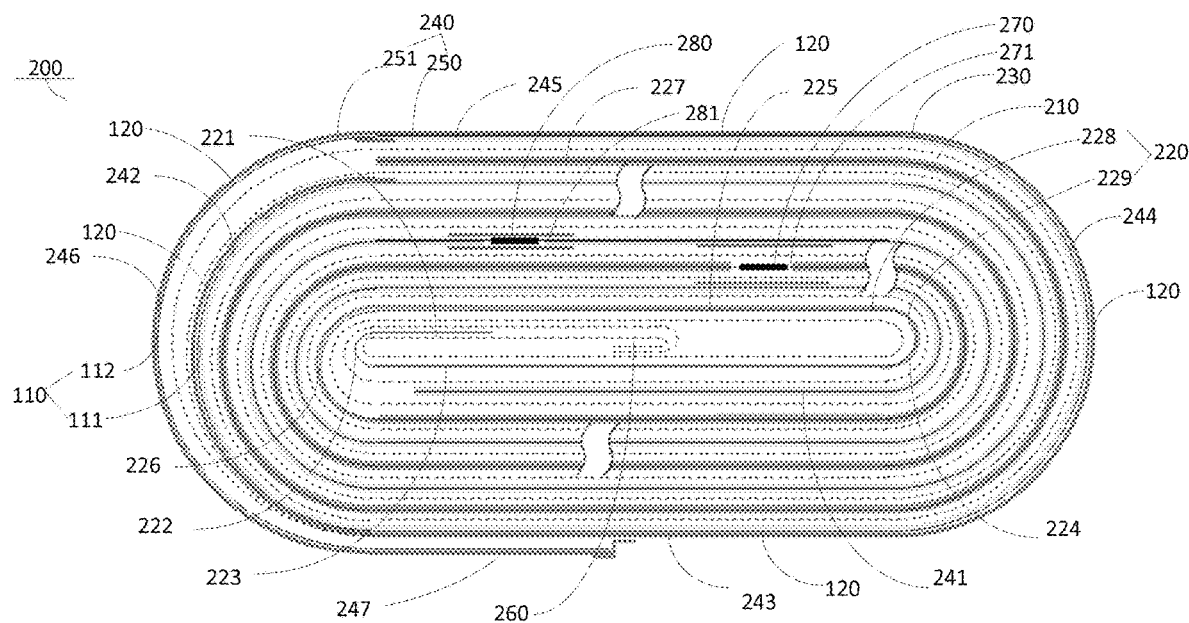
FIG. 6 is a sectional view of a battery cell according to another embodiment of the present application.
Figure 7:
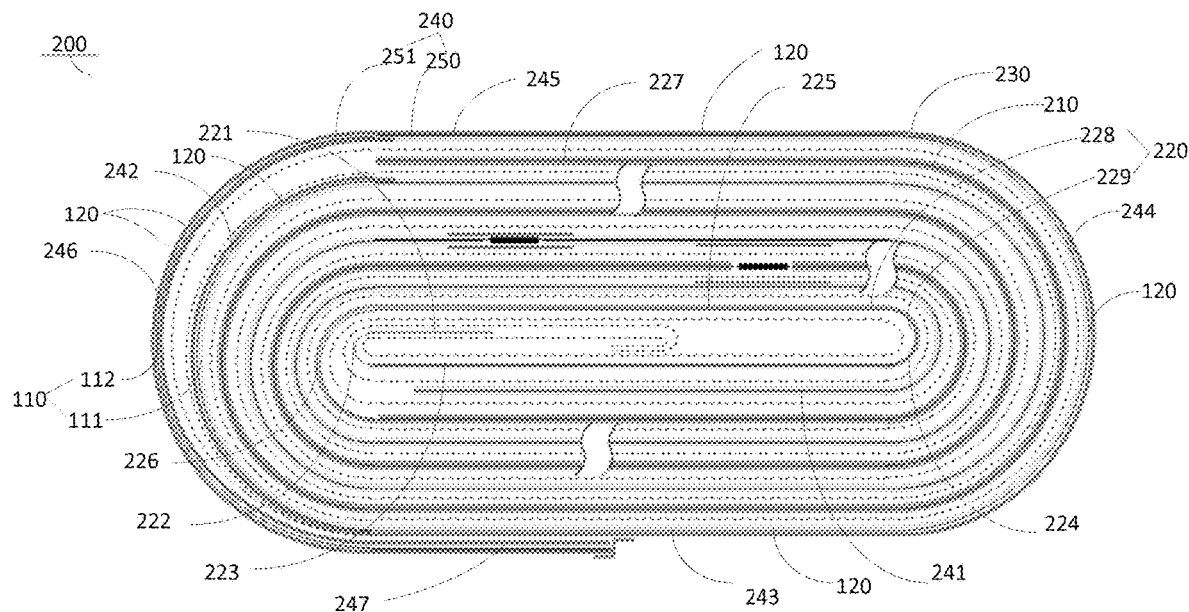
FIG. 7 is a sectional view of a battery cell according to another embodiment of the present application.

In some embodiments, as illustrated in FIG. 4, in a direction away from the center of the battery cell 200, a surface of the second uncoated region 251 from the fifth bent segment 244 to the sixth bent segment 246 is provided with the protective layer 120. It is understood that surfaces of the fifth bent segment 244, the fourth straight segment 245 and the sixth bent segment 246 are provided with the protective layer 120. In some embodiments, FIG. 5 shows another arrangement of the protective layer 120, in which different from FIG. 4, and in the direction away from the center of the battery cell 200, the protective layer 120 is also provided on the surface of the second uncoated region 251 of the fourth bent segment 242. In some embodiments, FIG. 6 shows another arrangement of the protective layer 120, in which different from FIG. 5, the protective layer 120 is also provided on the surface of the second uncoated region 251 of the third straight segment 243 and the second tail segment 247 in the direction away from the center of the battery cell 200. In some embodiments, FIG. 7 shows another arrangement of the protective layer 120, in which different from FIG. 6, the protective layer 120 is also provided on the surface of the second uncoated region 251 of the sixth bent segment 246 in a direction facing the center of the battery cell 200.

In some embodiments, the protective layer 120 may also be respectively provided on surfaces of the first uncoated region 229 and the second uncoated region 251 at the same time to further enhance the safety performance of the battery cell 200. For example, the protective layer 120 may be provided on at least a part of the surface of the first uncoated region 229 from the first starting segment 221 to the third bent segment 226; meanwhile, the protective layer 120 may also be provided on at least a part of the surface of the second uncoated region 251 from the fourth bent segment 242 to the second tail segment 247. The more the protective layer 120 is disposed on the surfaces of the first uncoated region 229 and the second uncoated region 251, the less the probability that the corresponding current collector participates in the internal short circuit is, and the higher the safety performance of the battery cell is.

Figure 8:
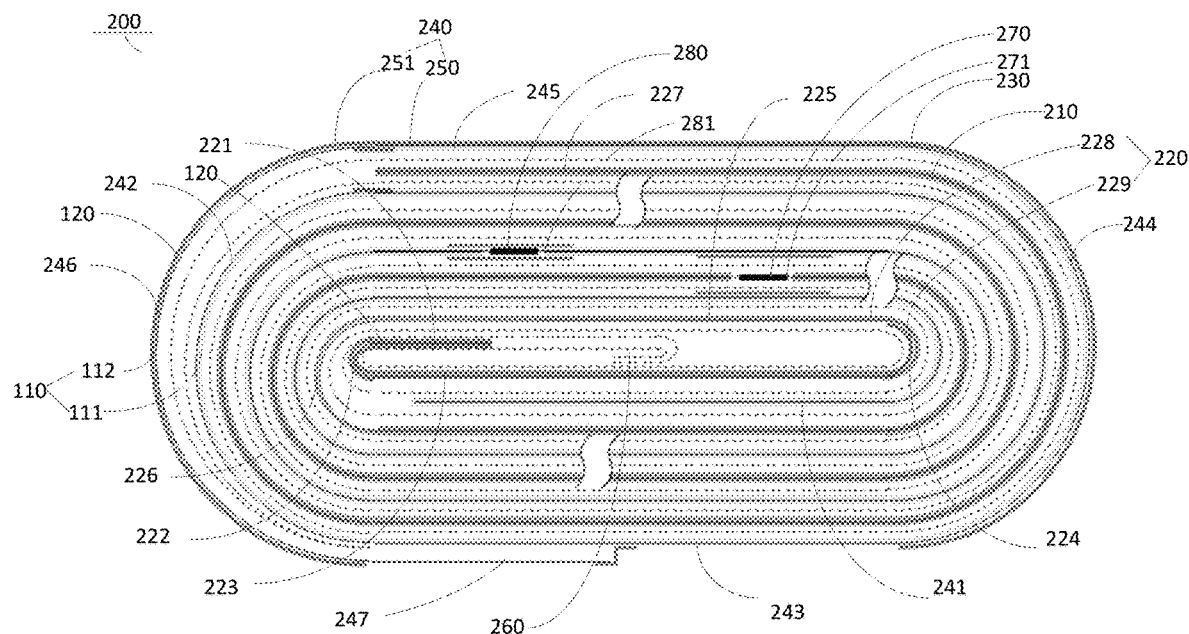
FIG. 8 is a sectional view of a battery cell according to another embodiment of the present application.

Specifically, as illustrated in FIG. 8, the protective layer 120 is provided on two surfaces of the first uncoated region 229 of the first starting segment 221 and the first bent segment 222, and the protective layer 120 is also provided on the surface of the first straight segment 223 and the second bent segment 224 towards the center of the battery cell 200. Meanwhile, in the direction away from the center of the battery cell 200, the surface of the second uncoated region 251 from the fifth bent segment 244 to the sixth bent segment 246 is also provided with the protective layer 120.

Figure 9:
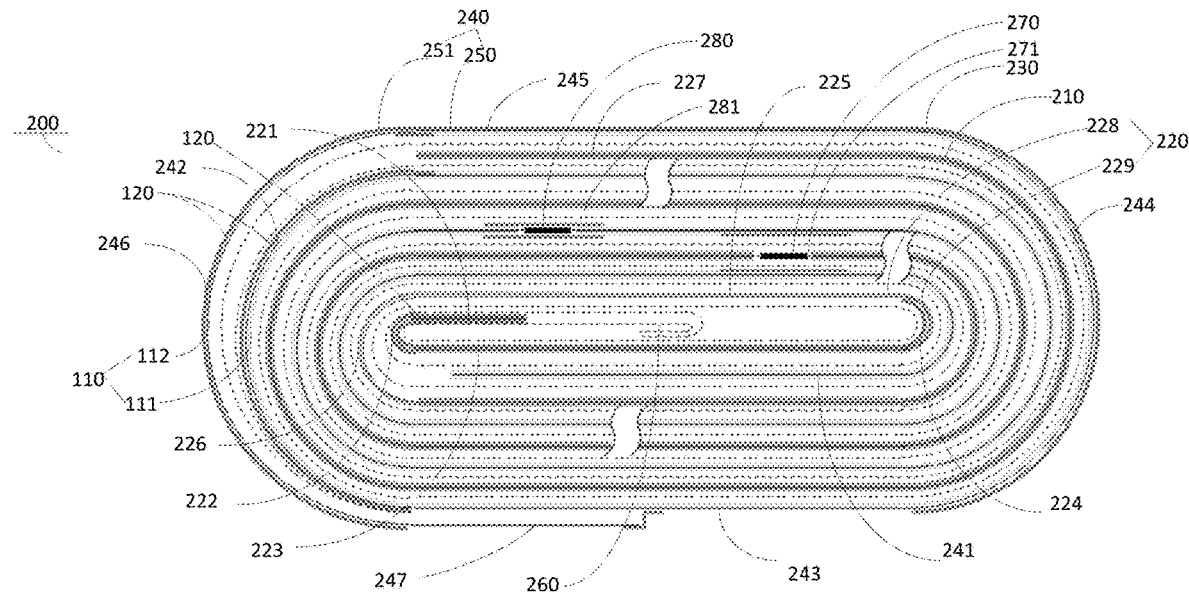
FIG. 9 is a sectional view of a battery cell according to another embodiment of the present application.
Figure 10:
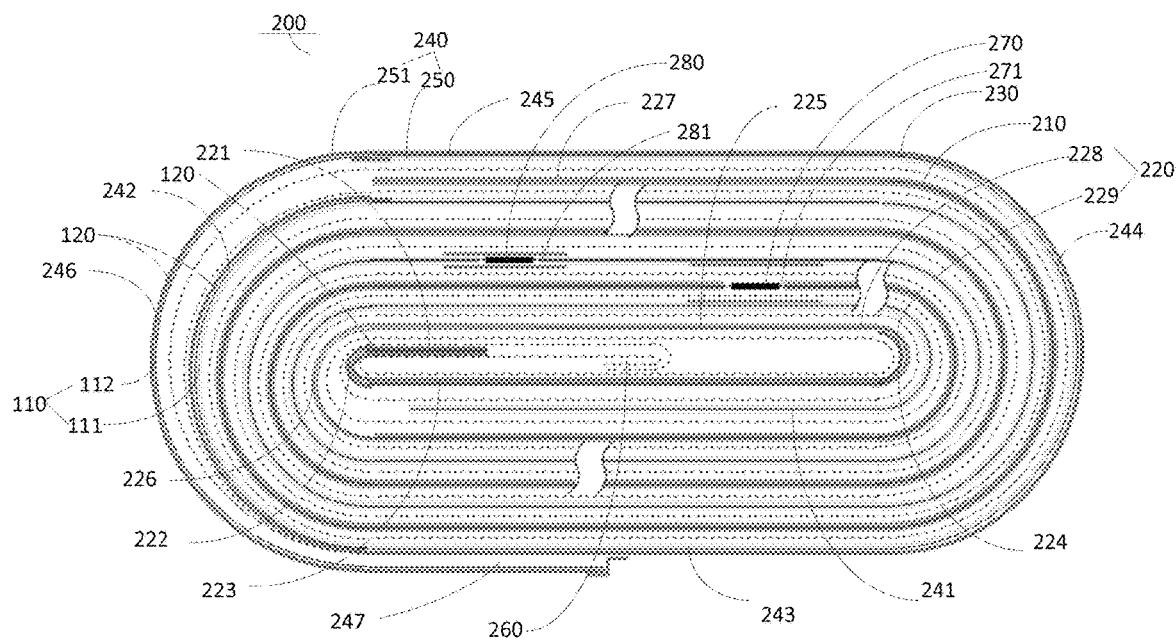
FIG. 10 is a sectional view of a battery cell according to another embodiment of the present application.
Figure 11:
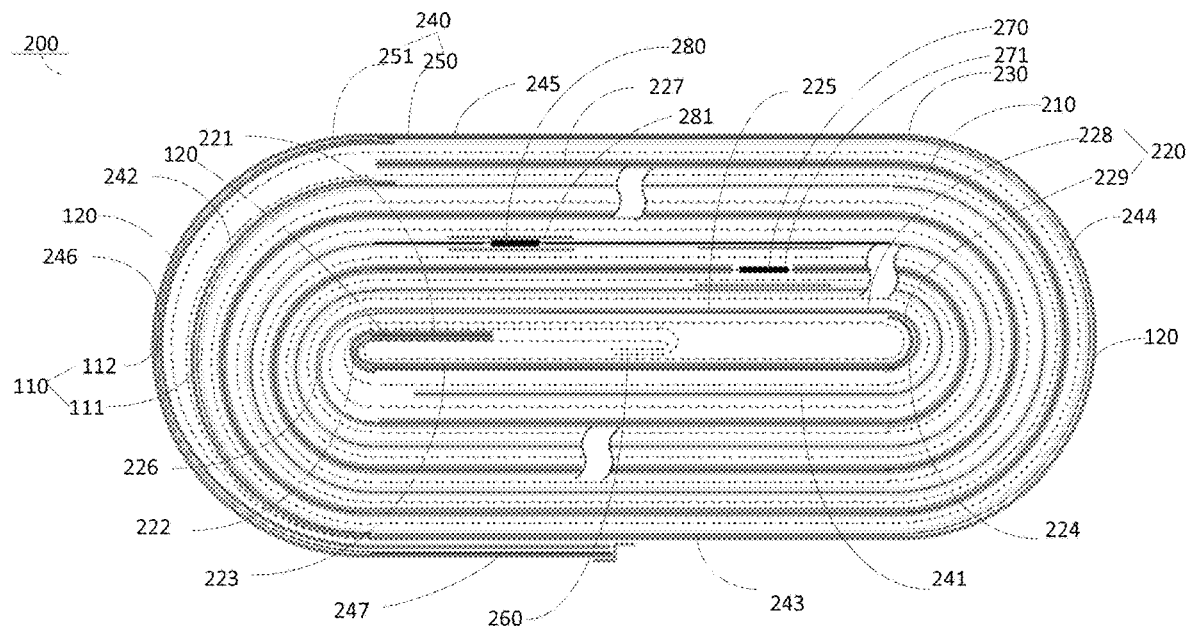
FIG. 11 is a sectional view of a battery cell according to another embodiment of the present application.
Figure 12:
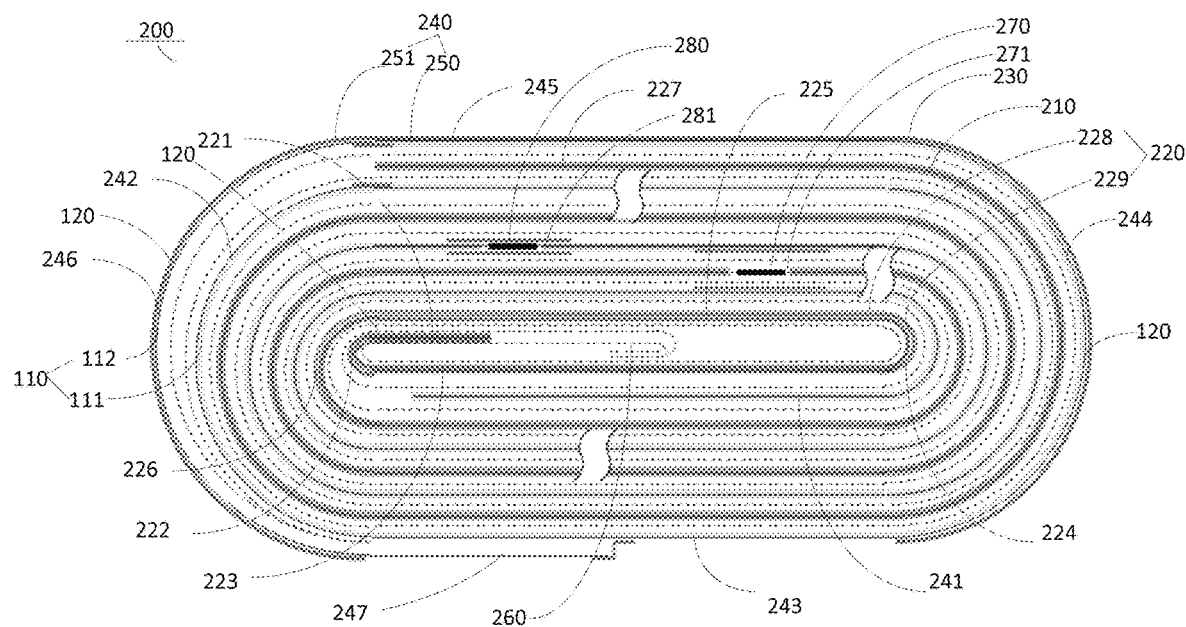
FIG. 12 is a sectional view of a battery cell according to another embodiment of the present application.
Figure 13:
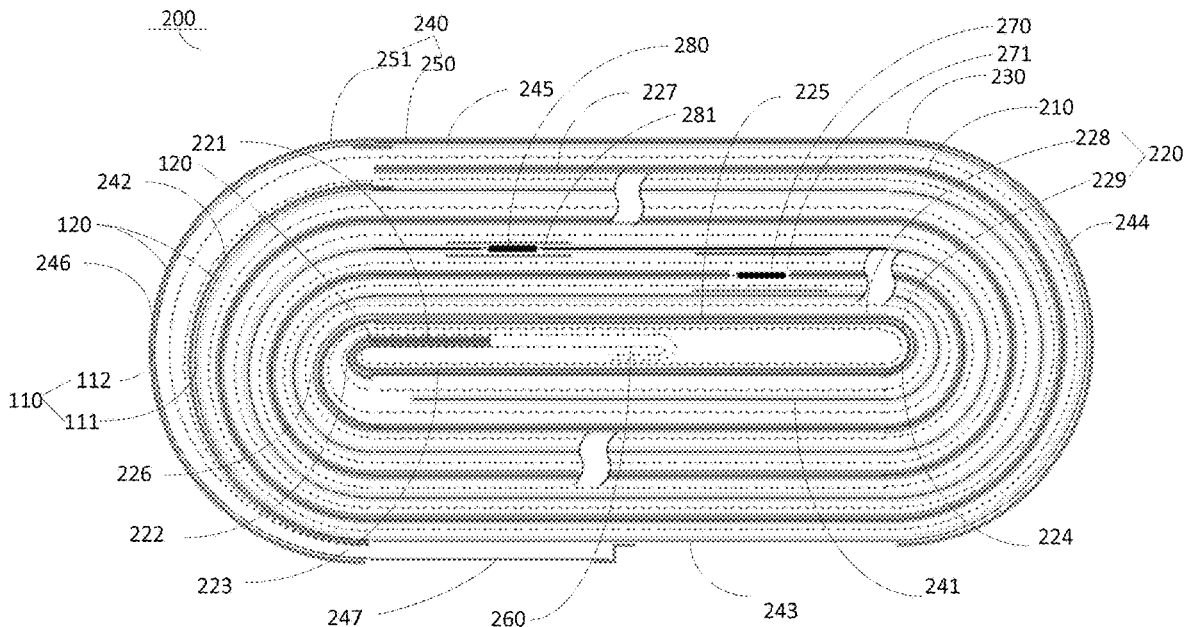
FIG. 13 is a sectional view of a battery cell according to another embodiment of the present application.
Figure 14:
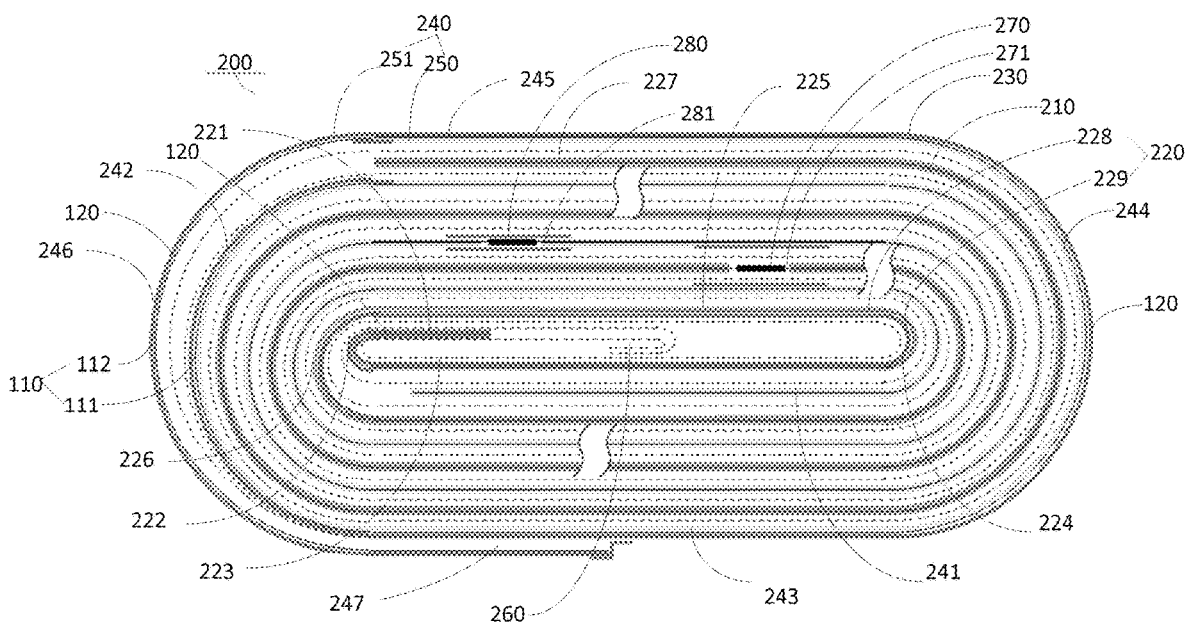
FIG. 14 is a sectional view of a battery cell according to another embodiment of the present application.
Figure 15:
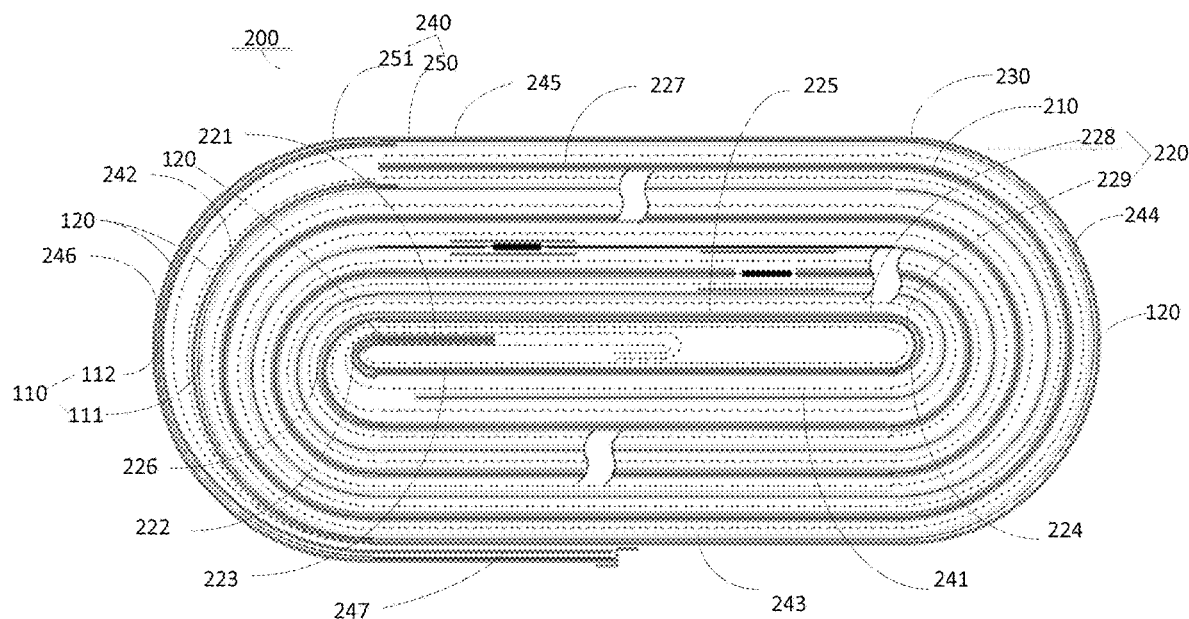
FIG. 15 is a sectional view of a battery cell according to another embodiment of the present application.

In some embodiments, FIG. 9 shows another arrangement of the protective layer 120, in which different from FIG. 8, the protective layer 120 is also provided on the surface of the second uncoated region 251 of the fourth bent segment 242. FIG. 10 shows another arrangement of the protective layer 120, in which different from FIG. 9, and in the direction away from the center of the battery cell 200, the protective layer 120 is also provided on the surface of the second uncoated region 251 of the third straight segment 243 and the second tail segment 247. FIG. 11 shows another arrangement of the protective layer 120, in which different from FIG. 10, and in the direction facing the center of the battery cell 200, the protective layer 120 is also provided on the surface of the second uncoated region 251 of the sixth bent segment 246. In some embodiments, FIG. 12 shows another arrangement of the protective layer 120, in which different from FIG. 8, and in the direction towards the center of the battery cell 200, the protective layer 120 is also provided on the surface of the first uncoated region 229 of the second straight segment 225 and the third bent segment 226. FIG. 13 shows another arrangement of the protective layer 120, in which different from FIG. 12, and in the direction away from the center of the battery cell 200, the protective layer 120 is also provided on the surface of the second uncoated region 251 of the fourth bent segment 242. FIG. 14 shows another arrangement of the protective layer 120, in which different from FIG. 13, and in the direction away from the center of the battery cell 200, the protective layer 120 is also provided on the surface of the second uncoated region 251 of the third straight segment 243 and the second tail segment 247. FIG. 15 shows another arrangement of the protective layer 120, in which different from FIG. 14, and in the direction facing the center of the battery cell 200, the protective layer 120 is also provided on the surface of the second uncoated region 251 of the sixth bent segment 246.

According to some embodiments of the present application, a ratio of the thickness of the protective layer 120 to the thickness of the first current collector 220 is greater than or equal to 0.5, and less than or equal to 20. In some embodiments, a ratio of the thickness of the protective layer 120 to the thickness of the first active material layer 228 is greater than or equal to 0.25, and less than or equal to 1. In some embodiments, a ratio of the thickness of the protective layer 120 provided on the separator 260 to the thickness of the separator 260 is greater than or equal to 0.4, and less than or equal to 1.5.

According to some embodiments of the present application, the battery cell 200 may further include a first electrode tab 270 and a second electrode tab 280, as shown in FIGS. 16 to 19. In some embodiments, the first active material layer 228 is provided with a first groove 271, and the first electrode tab 270 is disposed within the first groove 271 to improve the energy density of the battery cell 200; alternatively, the first electrode tab 270 may be provided on the surface of the first uncoated region 229. In some embodiments, the second active material layer 250 is provided with a second groove 281, and the second electrode tab 280 is disposed within the second groove 281 to improve the energy density of the battery cell 200; alternatively, the second electrode tab 280 may be provided on the surface of the second uncoated region 251.

Figure 16:
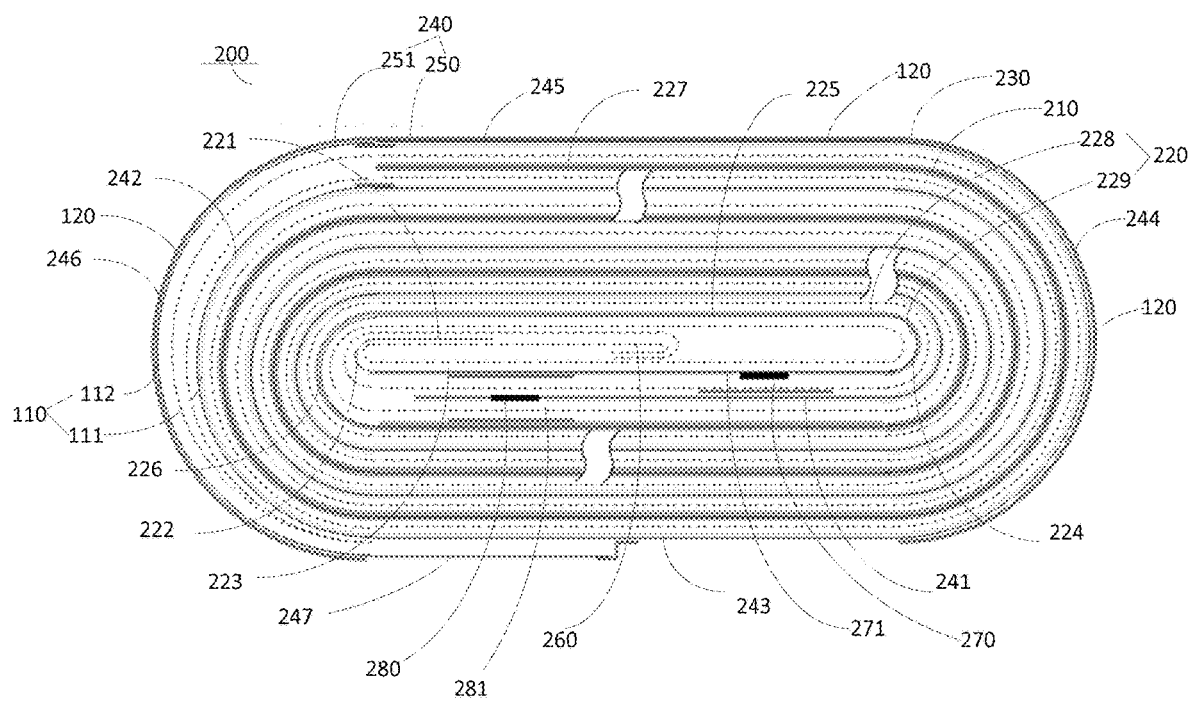
FIG. 16 is a sectional view of a battery cell according to another embodiment of the present application.
Figure 17:
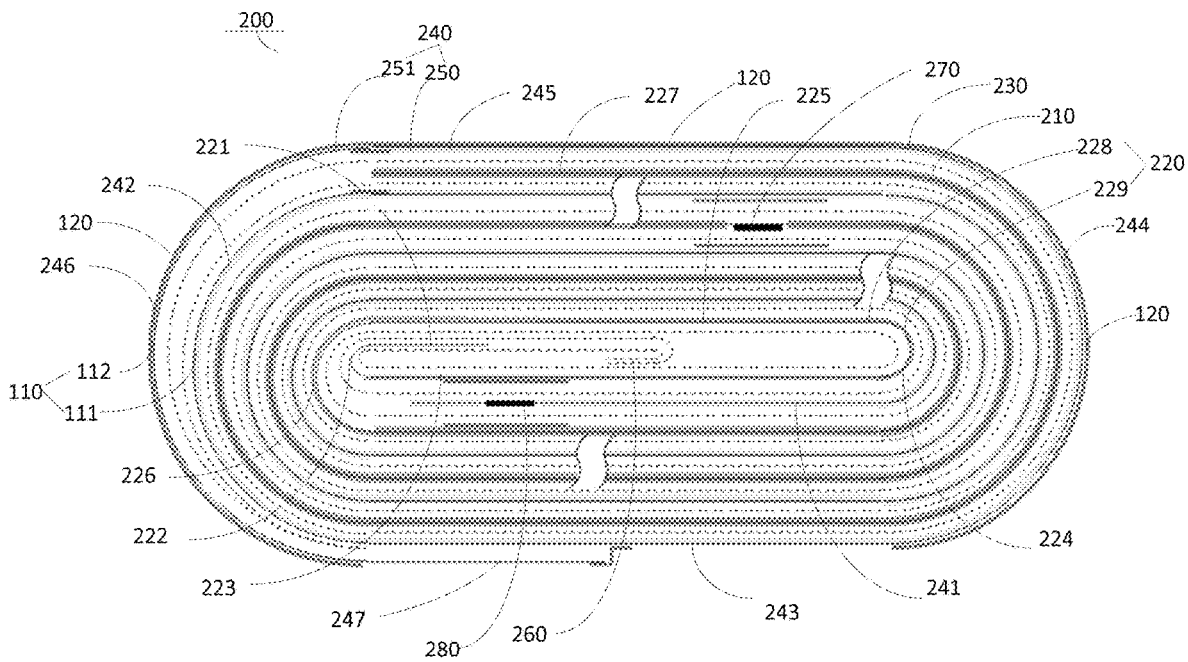
FIG. 17 is a sectional view of a battery cell according to another embodiment of the present application.
Figure 18:
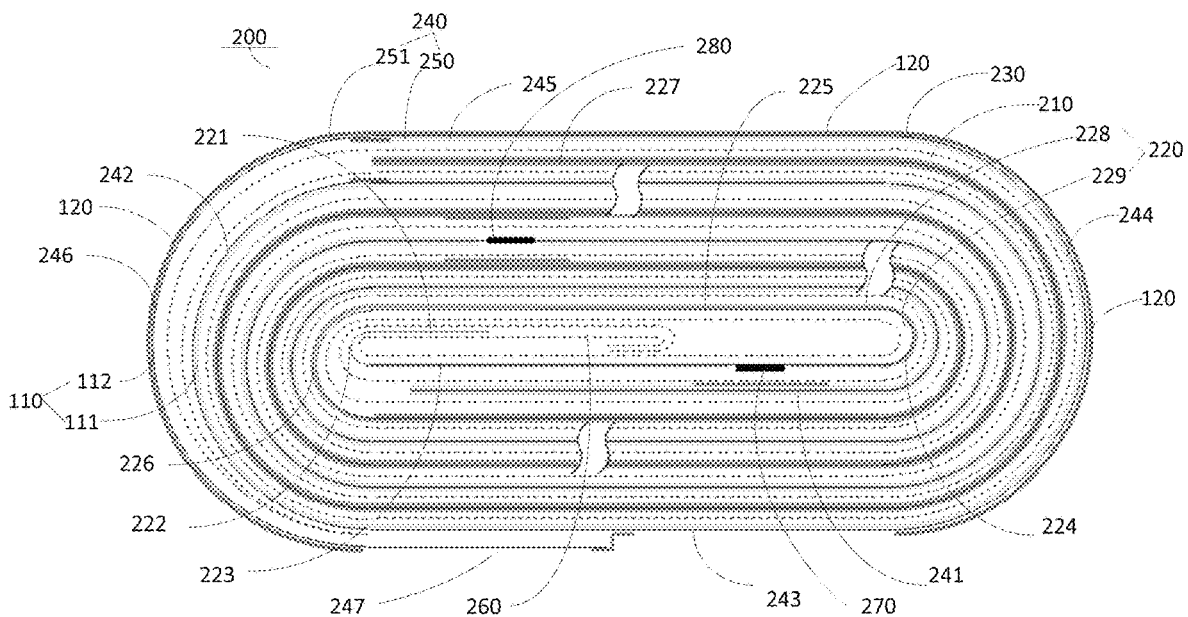
FIG. 18 is a sectional view of a battery cell according to another embodiment of the present application.

Specifically, as illustrated in FIG. 16, the first electrode tab 270 is disposed in the first groove 271 of the first active material layer 228 at the first straight segment 223, and the second electrode tab 280 is disposed in the second groove 281 of the second active material layer 250 at the second starting segment 241. In some embodiments, as illustrated in FIG. 17, the first electrode tab 270 is disposed in the first groove 271 of the first active material layer 228 at other positions, and the second electrode tab 280 is disposed in the second groove 281 of the second active material layer 250 at the second starting segment 241. In some embodiments, as illustrated in FIG. 18, the first electrode tab 270 is disposed in the first groove 271 of the first active material layer 228 at the first straight segment 223, and the second electrode tab 280 is disposed in the second groove 281 of the second active material layer 250 at other positions. The battery cell 200 illustrated in FIGS. 1 to 15 may select any one of electrode tab arrangements in FIGS. 16 to 20 based on actual needs.

Figure 19:
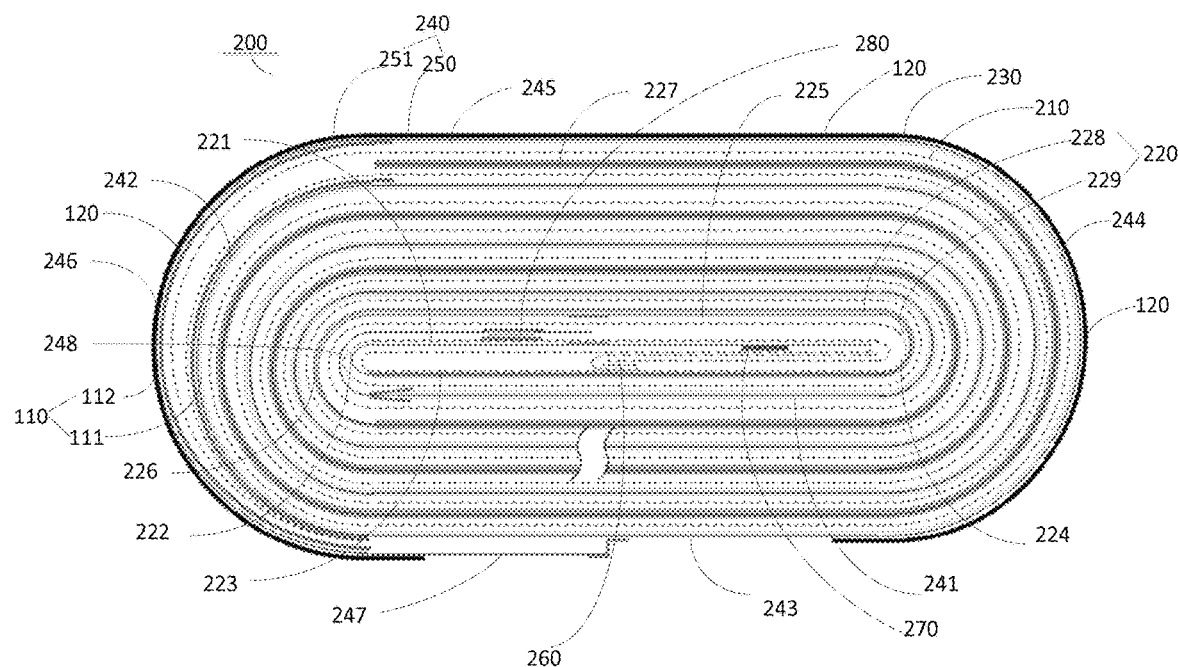
FIG. 19 is a sectional view of a battery cell according to another embodiment of the present application.

The first electrode tab 270 and the second electrode tab 280 may be arranged in the following way. As illustrated in FIG. 19, the second current collector 240 may include an extension portion 248, and the extension portion 248 is connected with the second starting segment 241 and extends into the first starting segment 221 in the winding direction of the battery cell 200 (and along a direction opposite to the winding direction of the battery cell). The first electrode tab 270 is disposed on a surface of the first starting segment 221, and the second electrode tab 280 may be disposed on a surface of the extension portion 248.

Thus, the arrangement position of the electrode tab may be arbitrarily changed based on an impedance design of the battery cell 200, and a thickness of the electrode tab may be ensured at the same time in such a way that the thickness of the electrode tab is smaller than the thickness of the separator, thereby preventing the electrode tab from being pressed, so as to reduce a risk of internal short-circuits caused by welding burrs piercing the separator after the electrode tab is pressed, thereby reducing the short-circuit points significantly, and enhancing the safety performance of the battery cell 200. Additionally, the electrode tab may be formed by cutting the current collector, and finally welded at the head of the battery cell, thereby preventing the electrode tab from being pressed, significantly reducing the short-circuit points of the electrode tab, and improving the safety performance of the battery cell 200. The electrode tab adopts these two arrangements to reduce the internal resistance of the battery cell, and compensate for the discharge performance of the battery cell, so as to improve the safety performance of the battery cell while the discharge performance of the battery cell does not deteriorate.

According to some embodiments of the present application, as illustrated in FIG. 20, the battery cell 200 is formed by sequentially stacking a plurality of first electrode sheets 210, a plurality of separators 260, and a plurality of second electrode sheets 230. Each first electrode sheet 210 is provided with the first electrode tab 270, and each second electrode sheet 230 is provided with the second electrode tab 280. A plurality of first electrode tabs 270 are welded to form one first electrode tab, and a plurality of second electrode tabs 280 are welded to form one second electrode tab. The second electrode sheet 230 is disposed at the outermost side of the battery cell 200, and a surface of the second current collector 240 towards the outermost side of the battery cell 200 is provided with the second uncoated region 251, the protective layer 120 is provided on at least a part of the surface of the second uncoated region 251. In some embodiments, the protective layer 120 may be provided on the uppermost surface and the lowermost surface of the battery cell 200. The second electrode sheet may be a cathode electrode sheet or may be an anode electrode sheet.

In some embodiments, the present application further discloses a battery, and the battery includes a packaging case and a battery cell 200. The battery cell 200 is disposed within the packaging case, and the battery cell 200 includes a first electrode sheet 210, a second electrode sheet 230, and a separator 260. The first electrode sheet 210 includes a first current collector 220, the first current collector 220 includes a first coated region provided with a first active material layer 228 and a first uncoated region 229 that is not provided with the first active material layer 228. The second electrode sheet 230 includes a second current collector 240, the second current collector 240 includes a second coated region provided with a second active material layer 250 and a second uncoated region 251 that is not provided with the second active material layer 250. The separator 260 is disposed between the first electrode sheet 210 and the second electrode sheet 230. The battery cell 200 is formed by winding or stacking the first electrode sheet 210, the separator 260 and the second electrode sheet 230 in sequence. A surface of at least one of the first uncoated region 229 and the second uncoated region 251 is provided with the protective layer 120, and the protective layer 120 has a porosity of 0% to 95%.

For the battery according to the embodiments of the present application, by providing the surface of at least one of the first uncoated region 229 and the second uncoated region 251 with the protective layer 120, when the battery cell 200 is internally short-circuited, the contact resistance of the electrode sheet may be increased, the discharge power may be lowered, and the thermal runaway probability of the battery cell 200 may be reduced, thereby improving the safety performance of the battery cell 200 and the battery. In addition, by providing the above protective layer 120 on the separator 260, the thermal shrinkage of the separator 260 of the battery cell 200 may be improved, and the safety performance of the battery may be further enhanced.

Next, some specific embodiments are given to elaborate the present application. For example, in a case where the first current collector 220 is a copper foil, the first electrode tab 270 is a nickel (Ni) electrode tab, the second current collector 240 is an aluminum (Al) foil, and the second electrode tab 280 is an aluminum(Al) electrode tab, the thickness of the protective layer/the thickness of the current collector, and the thickness of the protective layer/the thickness of the active material layer in the following embodiments refer to a ratio of the thickness of the protective layer to the thickness of the first current collector or the second current collector, and a ratio of the thickness of the protective layer to the thickness of the first active material layer or the second active material layer, respectively, in which the protective layer is provided on the uncoated region of the first current collector or the second current collector.

Embodiment 1

Using the battery cell structure as shown in FIG. 2, a battery cell is manufactured after encapsulation, liquid injection, and formation. The protective layer 120 is an aluminum oxide layer. And the protective layer 120 has a porosity of 19%, a thickness of 20 μm, and a conductivity of $8\times10^{-14}$ S/m. A ratio of a thickness of the protective layer 120 to a thickness of the current collector is 200%, while a ratio of the thickness of the protective layer 120 to the thickness of the active material layer is 10%, it is understood that the current collector refers to the corresponding current collector provided with the protective layer 120 (i.e., the first current collector 220), and the protective layer 120 and the active material layer refer to that disposed on the same current collector (i.e., the first active material layer 228). One surface of the separator 260 is provided with the protective layer 120, and a thickness of the protective layer 120 to a thickness of the separator 260 is 50%.

Embodiment 2

The protective layer 120 has the same parameters as that in Embodiment 1, the difference is that the battery cell structure shown in FIG. 3 is adopted.

Embodiment 3

The protective layer 120 has the same parameters as that in Embodiment 1, the difference is that the battery cell structure shown in FIG. 4 is adopted.

Embodiment 4

The protective layer 120 has the same parameters as that in Embodiment 1, the difference is that the battery cell structure shown in FIG. 5 is adopted.

Embodiment 5

The protective layer 120 has the same parameters as that in Embodiment 1, the difference is that the battery cell structure shown in FIG. 6 is adopted.

Embodiment 6

The protective layer 120 has the same parameters as that in Embodiment 1, the difference is that the battery cell structure shown in FIG. 7 is adopted.

Embodiment 7

The protective layer 120 has the same parameters as that in Embodiment 1, the difference is that the battery cell structure shown in FIG. 8 is adopted.

Embodiment 8

The protective layer 120 has the same parameters as that in Embodiment 1, the difference is that the battery cell structure shown in FIG. 9 is adopted.

Embodiment 9

The protective layer 120 has the same parameters as that in Embodiment 1, the difference is that the battery cell structure shown in FIG. 10 is adopted.

Embodiment 10

The protective layer 120 has the same parameters as that in Embodiment 1, the difference is that the battery cell structure shown in FIG. 11 is adopted.

Embodiment 11

The protective layer 120 has the same parameters as that in Embodiment 1, the difference is that the battery cell structure shown in FIG. 12 is adopted.

Embodiment 12

The protective layer 120 has the same parameters as that in Embodiment 1, the difference is that the battery cell structure shown in FIG. 13 is adopted.

Embodiment 13

The protective layer 120 has the same parameters as that in Embodiment 1, the difference is that the battery cell structure shown in FIG. 14 is adopted.

Embodiment 14

The protective layer 120 has the same parameters as that in Embodiment 1, the difference is that the battery cell structure shown in FIG. 15 is adopted.

Embodiment 15

The protective layer 120 has the same parameters as that in Embodiment 1, the difference is that the battery cell structure shown in FIG. 16 is adopted.

Embodiment 16

The protective layer 120 has the same parameters as that in Embodiment 1, the difference is that the battery cell structure shown in FIG. 17 is adopted.

Embodiment 17

The protective layer 120 has the same parameters as that in Embodiment 1, the difference is that the battery cell structure shown in FIG. 18 is adopted.

Embodiment 18

This embodiment is the same as Embodiment 14, except that the protective layer 120 is a magnesium oxide layer having a conductivity of $7 \times 10^{-14}$ S/m.

Embodiment 19

This embodiment is the same as Embodiment 14, except that the protective layer 120 is a lithium cobalt oxide layer having a conductivity of $6 \times 10^{-2}$ S/m.

Embodiment 20

This embodiment is the same as Embodiment 14, except that the protective layer 120 is a graphite layer having a conductivity of $4 \times 10^5$ S/m.

Embodiment 21

This embodiment is the same as Embodiment 8, except that the protective layer 120 is an adhesive tape, a major ingredient of the adhesive tape is a mixture composed of polyethylene terephthalate, butyl rubber and aluminum oxide, and the adhesive tape has a porosity of 0%, a thickness of 20 μm, and a conductivity of $9 \times 10^{-14}$ S/m.

Embodiment 22

This embodiment is the same as Embodiment 8, except that the protective layer 120 is a boehmite layer having a porosity of 5% and a conductivity of $5 \times 10^{-14}$ S/m.

Embodiment 23

This embodiment is the same as Embodiment 22, except that the protective layer 120 has porosity of 10%.

Embodiment 24

This embodiment is the same as Embodiment 22, except that the protective layer 120 has a porosity of 15%.

Embodiment 25

This embodiment is the same as Embodiment 22, except that the protective layer 120 has a porosity of 19%.

Embodiment 26

This embodiment is the same as Embodiment 22, except that the protective layer 120 has a porosity of 50%.

Embodiment 27

This embodiment is the same as Embodiment 22, except that the protective layer 120 has a porosity of 70%.

Embodiment 28

This embodiment is the same as Embodiment 22, except that the protective layer 120 has a porosity of 95%.

Embodiment 29

This embodiment is the same as Embodiment 8, except that the protective layer 120 is a zirconium oxide layer having a porosity of 15%, a thickness of 20 μm, and a conductivity of $6 \times 10^{-14}$ S/m.

Embodiment 30

This embodiment is the same as Embodiment 29, except that the protective layer 120 is a silicon oxide layer having a conductivity of $4 \times 10^{-14}$ S/m.

Embodiment 31

This embodiment is the same as Embodiment 29, except that the protective layer 120 is a calcium oxide layer having a conductivity of $7 \times 10^{-14}$ S/m.

Embodiment 32

Using the battery cell structure as shown in FIG. 8, a battery cell is manufactured after encapsulation, liquid injection, and formation. The protective layer 120 is a boehmite layer having a porosity of 19%, a thickness of 0.5 μm, and a conductivity of $5 \times 10^{-14}$ S/m. A ratio of a thickness of the protective layer to a thickness of the current collector is 5%, while a ratio of a thickness of the protective layer to a thickness of the active material layer is 0.25%. It is understood that the current collector refers to the corresponding current collector provided with the protective layer 120 (i.e., the first current collector 220 and the second current collector 240), and the protective layer 120 and the active material layer refer to that disposed on the same current collector (i.e., the first active material layer 228 and the second active material layer 250). The ratio of the thickness of the protective layer 120 on the separator 260 to a thickness of a separator is 50%.

Embodiment 33

This embodiment is the same as Embodiment 32, except that the protective layer 120 has a thickness of 5 μm, a ratio of the thickness of the protective layer 120 to the thickness of the current collector is 50%, while a ration of the thickness of the protective layer to the thickness of the active material layer is 2.5%, and a ratio of the thickness of the protective layer 120 on the separator 260 to the thickness of the separator 260 is 50%.

Embodiment 34

This embodiment is the same as Embodiment 32, except that the protective layer 120 has a thickness of 10 μm, a ratio of the thickness of the protective layer to the thickness of the current collector is 100%, while a ratio of the thickness of the protective layer to the thickness of the active material layer is 5%, and a ratio of the thickness of the protective layer on the separator 260 to the thickness of the separator is 50%.

Embodiment 35

This embodiment is the same as Embodiment 32, except that the protective layer 120 has a thickness of 20 μm, a ratio of the thickness of the protective layer to the thickness of the current collector is 200%, while a ratio of the thickness of the protective layer to the thickness of the active material layer is 10%, and a ratio of the thickness of the protective layer on the separator 260 to the thickness of the separator is 50%.

Embodiment 36

This embodiment is the same as Embodiment 32, except that the protective layer 120 has a thickness of 50 μm, a ratio of the thickness of the protective layer to the thickness of the current collector is 500%, while a ratio of the thickness of the protective layer to the thickness of the active material layer is 25%, and a ratio of the thickness of the protective layer on the separator 260 to the thickness of the separator is 50%.

Embodiment 37

This embodiment is the same as Embodiment 32, except that the protective layer 120 has a thickness of 100 μm, a ratio of the thickness of the protective layer to the thickness of the current collector is 1000%, while a ratio of the thickness of the protective layer to the thickness of the active material layer is 50%, and a ratio of the thickness of the protective layer on the separator 260 to the thickness of the separator is 50%.

Embodiment 38

This embodiment is the same as Embodiment 32, except that the protective layer 120 has a thickness of 200 μm, a ratio of the thickness of the protective layer to the thickness of the current collector is 2000%, while a ratio of the thickness of the protective layer to the thickness of the active material layer is 100%, and a ratio of the thickness of the protective layer on the separator 260 to the thickness of the separator is 50%.

Embodiment 39

This embodiment is the same as Embodiment 3, except that a ratio of the thickness of the protective layer on the separator 260 to the thickness of the separator is 40%.

Embodiment 40

This embodiment is the same as Embodiment 3, except that a ratio of the thickness of the protective layer on the separator 260 to the thickness of the separator is 60%.

Embodiment 41

This embodiment is the same as Embodiment 3, except that the ratio of the thickness of the protective layer on the separator 260 to the thickness of the separator is 80%.

Embodiment 42

This embodiment is the same as Embodiment 3, except that a ratio of the thickness of the protective layer on the separator 260 to the thickness of the separator is 100%.

Embodiment 43

This embodiment is the same as Embodiment 3, except that a ratio of the thickness of the protective layer on the separator 260 to the thickness of the separator is 150%.

Embodiment 44

The protective layer 120 has the same parameters as that in Embodiment 1, the difference is that the battery cell structure shown in FIG. 19 is adopted.

Embodiment 45

The protective layer 120 has the same parameters as that in Embodiment 1, the difference is that the battery cell structure shown in FIG. 20 is adopted.

Embodiment 46

This embodiment is the same as Embodiment 15, except that the separator 260 is not provided with the protective layer 120.

Embodiment 47

This embodiment is the same as Embodiment 44, except that the separator 260 is not provided with the protective layer 120.

Embodiment 48

This embodiment is the same as Embodiment 45, except that the separator 260 is not provided with the protective layer 120.

COMPARATIVE EXAMPLE 1

This example is the same as Embodiment 1, i.e., adopting the battery cell structure shown in FIG. 2, except that the protective layer 120 is not provided.

COMPARATIVE EXAMPLE 2

This example is the same as Embodiment 18, i.e., adopting the battery cell structure shown in FIG. 19, except that the protective layer 120 is not provided.

COMPARATIVE EXAMPLE 3

This example is the same as Embodiment 45, i.e., adopting the battery cell structure shown in FIG. 20, except that the protective layer 120 is not provided.

The battery cells manufactured by the above embodiments 1-48 and comparative examples 1-3 are subjected to performance tests, including nail pass rate, ignition ratio, discharging ratio, battery cell internal resistance, energy density (ED), etc., and various performances may be tested by referring to the following test methods.

The test method and judgment conditions for the nail pass rate include: ① charging process: charging the battery cell to 4.4V with a constant current of 0.7 C, and then charging the battery cell to a charge current of 0.02 C with a constant voltage of 4.4V; ② nailing process: at a temperature of 25° C., using a steel nail with a diameter of 4 mm to pierce the center of the surface of the battery cell at a speed of 30 mm/s; ③ counting the battery cell burning situations: if the battery cell does not burn, it is recorded as passing the nail test; otherwise, it is invalid.

The test method and judgment conditions for the ignition of the battery cell caused by the pressure cycle include: ① disposing the battery cell between two flat glass plates while applying a pressure of 0.3 MPa; ② charging and discharging process: charging the battery cell to 4.4V with a constant current of 0.7 C, charging the battery cell to a charge current of 0.02 C with a constant voltage of 4.4V, leaving it to stand still for 5 minutes, discharging the battery cell to 3V with a constant discharge current of 0.5 C, and repeating this charging and discharging process for 20 times; ③ counting battery cell burning situations.

The test method for the discharging ratio includes: ① charging process: charging the battery cell to 4.4V with a constant current of 0.7 C, and charging the battery cell with a constant voltage of 4.4V to a charge current of 0.02 C; ② discharging process: discharging the battery cell to 3V with a constant discharge current of 0.2 C, recording the discharge capacity, and defining it as a first discharge capacity; ③ charging process: charging the battery cell to 4.4V with a constant current of 0.7 C, and charging the battery cell with a constant voltage of 4.4V to a charge current of 0.02 C; ④ discharging process: discharging the battery cell to 3V with a constant discharge current of 0.2 C, recording the discharge capacity, and defining it as a second discharge capacity; ⑤ calculating a discharging ratio at 2 C: discharging ratio=the second discharge capacity/the first discharge capacity.

The test method for internal resistance (impedance) of the battery cell includes: applying 1000 Hz and 50 mA disturbance to the battery cell by means of a battery internal resistance tester (AT520L) to obtain the AC (alternating current) internal resistance of the battery cell.

The conductivity test method includes: using a four-wire two-terminal method, that is, measuring the voltage and current at both ends of a sample to be tested under a pressure of 5 t (ton), determining the resistance R, and calculating the conductivity by the following formula:

$$\sigma = \frac{h}{R*S},$$

in which h is the height of the sample to be tested, and S is the area of the sample to be tested.

The calculation method of energy density (ED) includes: measuring the thickness of the battery cell with a battery thickness gauge, and calculating the energy density of the battery cell (see the following formula):

$$ED_{min} = \frac{capacity * plateform\ voltage}{a\ length\ of\ the\ cell * a\ width\ of\ the\ cell * a\ thickness\ of\ the\ cell}$$

in which, the cell capacity is 3.3 Ah, and the cell platform voltage is 3.88V.

After the battery cells of the above embodiments and comparative examples are subjected to the above performance tests, the test results are respectively listed in Table 1 below.

TABLE 1

Performance test results of battery cells of embodiments 1-48 and comparative examples 1-3

| | Parameters of protective layer | | | | | | Performance of battery cell | | | | |
|---|---|---|---|---|---|---|---|---|---|---|---|
| | Conductivity (S/m) | Porosity | Thickness (um) | Protective layer/current collector thickness ratio | Protective layer/active material thickness ratio | Protective layer/separator thickness ratio | Nail pass rate | ignition ratio | 2 C discharging ratio | internal resistance (mohm) | ED (Wh/L) |
| Example 1 | none | none | none | 0 | 0 | 0 | 0% | 0% | 91% | 18 | 650 |
| Example 2 | none | none | none | 0 | 0 | 0 | 0% | 2% | 86% | 30 | 650 |
| Example 3 | none | none | none | 0 | 0 | 0 | 0% | 0% | 96% | 8 | 650 |
| Embodiment 1 | $8 \times 10^{-14}$ | 19% | 20 | 200% | 10% | 50% | 75% | 0% | 88% | 18 | 642 |
| Embodiment 2 | $8 \times 10^{-14}$ | 19% | 20 | 200% | 10% | 50% | 85% | 0% | 88% | 18 | 634 |
| Embodiment 3 | $8 \times 10^{-14}$ | 19% | 20 | 200% | 10% | 50% | 90% | 0% | 88% | 18 | 646 |
| Embodiment 4 | $8 \times 10^{-14}$ | 19% | 20 | 200% | 10% | 50% | 90% | 0% | 88% | 18 | 646 |
| Embodiment 5 | $8 \times 10^{-14}$ | 19% | 20 | 200% | 10% | 50% | 95% | 0% | 88% | 18 | 638 |
| Embodiment 6 | $8 \times 10^{-14}$ | 19% | 20 | 200% | 10% | 50% | 95% | 0% | 88% | 18 | 634 |
| Embodiment 7 | $8 \times 10^{-14}$ | 19% | 20 | 200% | 10% | 50% | 95% | 0% | 88% | 18 | 638 |
| Embodiment 8 | $8 \times 10^{-14}$ | 19% | 20 | 200% | 10% | 50% | 95% | 0% | 88% | 18 | 638 |
| Embodiment 9 | $8 \times 10^{-14}$ | 19% | 20 | 200% | 10% | 50% | 95% | 0% | 88% | 18 | 630 |
| Embodiment 10 | $8 \times 10^{-14}$ | 19% | 20 | 200% | 10% | 50% | 95% | 0% | 88% | 18 | 626 |
| Embodiment 11 | $8 \times 10^{-14}$ | 19% | 20 | 200% | 10% | 50% | 95% | 0% | 88% | 18 | 630 |

TABLE 1-continued

Performance test results of battery cells of embodiments 1-48 and comparative examples 1-3

| | Parameters of protective layer | | | | | | Performance of battery cell | | | | |
|---|---|---|---|---|---|---|---|---|---|---|---|
| | Conductivity (S/m) | Porosity | Thickness (um) | Protective layer/current collector thickness ratio | Protective layer/active material thickness ratio | Protective layer/separator thickness ratio | Nail pass rate | ignition ratio | 2 C discharging ratio | internal resistance (mohm) | ED (Wh/L) |
| Embodiment 12 | $8 \times 10^{-14}$ | 19% | 20 | 200% | 10% | 50% | 95% | 0% | 88% | 18 | 630 |
| Embodiment 13 | $8 \times 10^{-14}$ | 19% | 20 | 200% | 10% | 50% | 95% | 0% | 88% | 18 | 622 |
| Embodiment 14 | $8 \times 10^{-14}$ | 19% | 20 | 200% | 10% | 50% | 100% | 0% | 88% | 18 | 618 |
| Embodiment 15 | $8 \times 10^{-14}$ | 19% | 20 | 200% | 10% | 50% | 90% | 0% | 83% | 27 | 646 |
| Embodiment 16 | $8 \times 10^{-14}$ | 19% | 20 | 200% | 10% | 50% | 90% | 0% | 86% | 22 | 646 |
| Embodiment 17 | $8 \times 10^{-14}$ | 19% | 20 | 200% | 10% | 50% | 90% | 0% | 88% | 18 | 646 |
| Embodiment 18 | $7 \times 10^{-14}$ | 19% | 20 | 200% | 10% | 50% | 100% | 0% | 88% | 18 | 618 |
| Embodiment 19 | $6 \times 10^{-2}$ | 19% | 20 | 200% | 10% | 50% | 95% | 0% | 88% | 18 | 618 |
| Embodiment 20 | $4 \times 10^{5}$ | 19% | 20 | 200% | 10% | 50% | 90% | 0% | 88% | 18 | 618 |
| Embodiment 21 | $9 \times 10^{-14}$ | 0% | 20 | 200% | 10% | 50% | 100% | 0% | 88% | 18 | 638 |
| Embodiment 22 | $5 \times 10^{-14}$ | 5% | 20 | 200% | 10% | 50% | 100% | 0% | 88% | 18 | 638 |
| Embodiment 23 | $5 \times 10^{-14}$ | 10% | 20 | 200% | 10% | 50% | 100% | 0% | 88% | 18 | 638 |
| Embodiment 24 | $5 \times 10^{-14}$ | 15% | 20 | 200% | 10% | 50% | 100% | 0% | 88% | 18 | 638 |
| Embodiment 25 | $5 \times 10^{-14}$ | 19% | 20 | 200% | 10% | 50% | 90% | 0% | 88% | 18 | 638 |
| Embodiment 26 | $5 \times 10^{-14}$ | 50% | 20 | 200% | 10% | 50% | 90% | 0% | 88% | 18 | 638 |
| Embodiment 27 | $5 \times 10^{-14}$ | 70% | 20 | 200% | 10% | 50% | 80% | 0% | 88% | 18 | 638 |
| Embodiment 28 | $5 \times 10^{-14}$ | 95% | 20 | 200% | 10% | 50% | 75% | 0% | 88% | 18 | 638 |
| Embodiment 29 | $6 \times 10^{-14}$ | 15% | 20 | 200% | 10% | 50% | 100% | 0% | 88% | 18 | 638 |
| Embodiment 30 | $4 \times 10^{-14}$ | 15% | 20 | 200% | 10% | 50% | 100% | 0% | 88% | 18 | 638 |
| Embodiment 31 | $7 \times 10^{-14}$ | 15% | 20 | 200% | 10% | 50% | 100% | 0% | 88% | 18 | 638 |
| Embodiment 32 | $5 \times 10^{-14}$ | 19% | 0.5 | 5% | 0.25% | 50% | 80% | 0% | 88% | 18 | 649 |
| Embodiment 33 | $5 \times 10^{-14}$ | 19% | 5 | 50% | 2.50% | 50% | 85% | 0% | 88% | 18 | 646 |
| Embodiment 34 | $5 \times 10^{-14}$ | 19% | 10 | 100% | 5% | 50% | 90% | 0% | 88% | 18 | 642 |
| Embodiment 35 | $5 \times 10^{-14}$ | 19% | 20 | 200% | 10% | 50% | 90% | 0% | 88% | 18 | 638 |
| Embodiment 36 | $5 \times 10^{-14}$ | 19% | 50 | 500% | 25% | 50% | 95% | 0% | 88% | 18 | 620 |
| Embodiment 37 | $5 \times 10^{-14}$ | 19% | 100 | 1000% | 50% | 50% | 100% | 0% | 88% | 18 | 590 |
| Embodiment 38 | $5 \times 10^{-14}$ | 19% | 200 | 2000% | 100% | 50% | 100% | 0% | 88% | 18 | 530 |
| Embodiment 39 | $8 \times 10^{-14}$ | 19% | 20 | 200% | 10% | 40% | 85% | 0% | 93% | 18 | 650 |
| Embodiment 40 | $8 \times 10^{-14}$ | 19% | 20 | 200% | 10% | 60% | 95% | 0% | 89% | 18 | 643 |
| Embodiment 41 | $8 \times 10^{-14}$ | 19% | 20 | 200% | 10% | 80% | 100% | 0% | 85% | 18 | 637 |
| Embodiment 42 | $8 \times 10^{-14}$ | 19% | 20 | 200% | 10% | 100% | 100% | 0% | 83% | 18 | 630 |
| Embodiment 43 | $8 \times 10^{-14}$ | 19% | 20 | 200% | 10% | 150% | 100% | 0% | 80% | 18 | 615 |
| Embodiment 44 | $8 \times 10^{-14}$ | 19% | 20 | 200% | 10% | 50% | 90% | 2% | 83% | 30 | 646 |
| Embodiment 45 | $8 \times 10^{-14}$ | 19% | 20 | 200% | 10% | 50% | 90% | 0% | 93% | 8 | 646 |
| Embodiment 46 | $8 \times 10^{-14}$ | 19% | 20 | 200% | 10% | 0 | 70% | 0% | 96% | 8 | 658 |

TABLE 1-continued

Performance test results of battery cells of embodiments 1-48 and comparative examples 1-3

| | Parameters of protective layer | | | | | Performance of battery cell | | | | |
|---|---|---|---|---|---|---|---|---|---|---|
| | Conductivity (S/m) | Porosity | Thickness (um) | Protective layer/current collector thickness ratio | Protective layer/active material thickness ratio | Protective layer/separator thickness ratio | Nail pass rate | ignition ratio | 2 C discharging ratio | internal resistance (mohm) | ED (Wh/L) |
| Embodiment 46 | | | | | | | | | | | |
| Embodiment 47 | $8 \times 10^{-14}$ | 19% | 20 | 200% | 10% | 0 | 70% | 2% | 86% | 30 | 658 |
| Embodiment 48 | $8 \times 10^{-14}$ | 19% | 20 | 200% | 10% | 0 | 70% | 0% | 96% | 8 | 658 |

It can be seen from embodiments 1-48 and examples 1-3 of Table 1 that the protective layer 120 is provided on the uncoated region of the current collector, or the protective layer 120 is provided on the surfaces of both of the uncoated region and the separator so as to improve the nail pass rate of the battery cell, i.e., enhance the safety performance of the battery cell. By comparison between embodiments 1-45 and embodiments 46-48 in Table 1, it can be seen that the battery cell coated with the protective layer on the surfaces of both of the uncoated region and the separator has a higher nail pass rate than the battery cell only coated with the protective layer on the surface of the uncoated region, that is, the safety performance of the battery cell coated with the protective layer on the surfaces of the uncoated region and the separator is better than that of the battery cell only coated with the protective layer on the surface of the uncoated region.

It can be seen from embodiments 1-14 of Table 1 that the more the protective layer 120 is applied on the surface of the uncoated region and the separator, the higher the nail pass rate of the battery cell is, i.e., the higher the safety performance of the battery cell is. It can be seen from embodiments 18-20 of Table 1 that the lower the conductivity of the protective layer is, the higher the nail pass rate of the battery cell is, i.e., the higher the safety performance of the battery cell is. It can be seen from embodiments 21-28 of Table 1 that the smaller the porosity of the protective layer is, the higher the nail pass rate of the battery cell is, i.e., the higher the safety performance of the battery cell is. It can be seen from embodiments 32-38 of Table 1 that the thicker the protective layer is coated on the surface of the uncoated region, the higher the nail pass rate of the battery cell is, i.e., the higher the safety performance of the battery cell is. It can be seen from embodiments 39-43 of Table 1 that the thicker the protective layer is coated on the surface of the separator, the higher the nail pass rate of the battery cell is, i.e., the higher the safety performance of the battery cell is.

In the specification, it is to be understood that terms such as "central," "thickness," "upper," "lower," "inner," "outer," and the like should be construed to refer to the orientation or position relationship as then described or as shown in the drawings under discussion. These relative terms are only for convenience and simplicity of description and do not indicate or imply that the referred device or element must have a particular orientation or be constructed or operated in a particular orientation. Thus, these terms shall not be construed to limit the present application. In the description of the present invention, "a plurality of" means two or more than two, unless specified otherwise.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present application. Thus, the appearances of the phrases throughout this specification are not necessarily referring to the same embodiment or example. Furthermore, the particular features, structures, materials, or characteristics may be combined in any suitable manner in one or more embodiments or examples.

Although embodiments of the present application have been shown and described, it would be appreciated by those skilled in the art that various changes, modifications, alternatives and variations may be made to the embodiments of the present application without departing from the principle and scope of the present application. The scope of the present application is defined by the claims or the like.

What is claimed is:

1. A battery cell, comprising:
   a first electrode sheet comprising a first current collector, the first current collector comprising a first coated region provided with a first active material layer and a first uncoated region without being provided with the first active material layer, wherein the first uncoated region is located at an inner portion of the battery cell;
   a first electrode tab, wherein the first electrode tab is disposed within a first groove formed in the first active material layer outside the first uncoated region, wherein both surfaces of the first current collector are provided with the first active material on both sides of the first groove, and
   wherein, in a direction away from a center of the battery cell, the first electrode tab is provided at a position on the first current collector after at least two bent segments of the first current collector;
   a second electrode sheet comprising a second current collector, the second current collector comprising a second coated region provided with a second active material layer and a second uncoated region without being provided with the second active material layer, wherein the second uncoated region is located at an outer portion of the battery cell;
   a second electrode tab, wherein the second electrode tab is disposed within a second groove formed in the second active material layer outside the second uncoated region, wherein both surfaces of the second current collector are provided with the second active material on both sides of the second groove, and
   wherein, in the direction away from the center of the battery cell, the second electrode tab is provided at a position on the second current collector after at least two bent segments of the second current collector;
a separator disposed between the first electrode sheet and the second electrode sheet; and
the battery cell formed by winding the first electrode sheet, the separator, and the second electrode sheet in sequence;
wherein a protective layer is provided on two surfaces of the first uncoated region and an outer surface of the second uncoated region from a bent segment to a tail segment of the second electrode sheet, and the protective layer has a porosity of 0% to 19%;
wherein the protective layer is further provided on at least a part of both surfaces of the separator; a ratio of a thickness of the protective layer on the separator to a thickness of the separator ranges from 0.4 to 1.5.

2. The battery cell according to claim 1, wherein the protective layer has a conductivity of 0 S/m to $6 \times 10^{-2}$ S/m, and a material of the protective layer comprises an inorganic oxide.

3. The battery cell according to claim 1, wherein the battery cell is formed by winding,
the first current collector comprises:
a first starting segment;
a first bent segment connected with the first starting segment, a current collector opposite to the first starting segment and the first bent segment is defined as the first current collector;
a first straight segment, the first bent segment is disposed between the first starting segment and the first straight segment;
a second bent segment;
a second straight segment, the second bent segment is disposed between the first straight segment and the second straight segment; and
a third bent segment connected to the second straight segment and opposite to the first bent segment,
in a direction away from a center of the battery cell, a surface from the first straight segment to the third bent segment is provided with the first active material layer; and
the second current collector comprises a second starting segment, two surfaces of the second starting segment are provided with the second active material layer, and along a winding direction of the battery cell, the second starting segment is disposed between the first bent segment and the second bent segment.

4. The battery cell according to claim 3, wherein the protective layer is provided on two surfaces of the first uncoated region of the first starting segment, the protective layer is provided on two surfaces of the first uncoated region of the first bent segment, and in a direction facing the center of the battery cell, and the protective layer is provided on at least a part of a surface of the first uncoated region from the first starting segment to the third bent segment.

5. The battery cell according to claim 4, wherein a thickness ratio of the protective layer to the first current collector is greater than or equal to 0.05, and less than or equal to 20; and
a thickness ratio of the protective layer to the first active material layer is greater than or equal to 0.0025, and less than or equal to 1.

6. The battery cell according to claim 3, wherein the second current collector comprises:
a fourth bent segment;
a third straight segment;
a fifth bent segment, the third straight segment is disposed between the fourth bent segment and the fifth bent segment;
a fourth straight segment;
a sixth bent segment opposite to the fourth bent segment, the fourth straight segment is disposed between the fifth bent segment and the sixth bent segment;
a second tail segment connected to the sixth bent segment; and
the first current collector comprises a first tail segment, two surfaces of the first tail segment are provided with the first active material layer, and along the winding direction of the battery cell, the first tail segment is disposed between the fifth bent segment and the sixth bent segment.

7. The battery cell according to claim 6, wherein in a direction facing the center of the battery cell, the protective layer is provided on at least a part of a surface of the second uncoated region from the sixth bent segment to the second tail segment.

8. The battery cell according to claim 1, wherein a thickness ratio of the protective layer to the first current collector is greater than or equal to 0.05, and less than or equal to 20; and
a thickness ratio of the protective layer to the first active material layer is greater than or equal to 0.0025, and less than or equal to 1.

9. The battery cell according to claim 6, wherein the second current collector further comprises an extension portion connected to the second starting segment, and in the winding direction of the battery cell, the extension portion extends into the first starting segment.

10. The battery cell according to claim 1, wherein the battery cell is formed by sequentially stacking a plurality of the first electrode sheets, a plurality of the separators, and a plurality of the second electrode sheets, the first electrode sheet is disposed at the outermost side of the battery cell, a surface of the first current collector towards the outermost side of the battery cell is provided with the first uncoated region, and the protective layer is provided on at least a part of a surface of the first uncoated region.

11. The battery cell according to claim 10, wherein the protective layer is further provided on at least a part of a surface of the separator.

12. A battery, comprising:
a packaging case; and
a battery cell disposed within the packaging case, the battery cell including:
a first electrode sheet comprising a first current collector, the first current collector comprising a first coated region provided with a first active material layer and a first uncoated region without being provided with the first active material layer, wherein the first uncoated region is located at an inner portion of the battery cell;
a first electrode tab, wherein the first electrode tab is disposed within a first groove formed in the first active material layer outside the first uncoated region, wherein both surfaces of the first current collector are provided with the first active material on both sides of the first groove, and
wherein, in a direction away from a center of the battery cell, the first electrode tab is provided at a position on the first current collector after at least two bent segments of the first current collector;
a second electrode sheet comprising a second current collector, the second current collector comprising a second coated region provided with a second active material layer and a second uncoated region without being provided with the second active material layer, wherein the second uncoated region is located at an outer portion of the battery cell;

a second electrode tab, wherein the second electrode tab is disposed within a second groove formed in the second active material layer outside the second uncoated region, wherein both surfaces of the second current collector are provided with the second active material on both sides of the second groove, and wherein, in the direction away from the center of the battery cell, the second electrode tab is provided at a position on the second current collector after at least two bent segments of the second current collector;

a separator disposed between the first electrode sheet and the second electrode sheet; and the battery cell formed by winding the first electrode sheet, the separator, and the second electrode sheet in sequence;

wherein a protective layer is provided on two surfaces of the first uncoated region and an outer surface of the second uncoated region from a bent segment to a tail segment of the second electrode sheet, and the protective layer has a porosity of 0% to 19%;

wherein the protective layer is further provided on at least a part of both surfaces of the separator; a ratio of a thickness of the protective layer on the separator to a thickness of the separator ranges from 0.4 to 1.5.

13. The battery cell according to claim 1, wherein the protective layer is provided on both the bent segment and the tail segment of the second uncoated region, and the battery cell further comprises the first electrode tab and the second electrode tab disposed in a central portion of the battery cell, away from the bent segment and the tail segment.

* * * * *